(12) United States Patent
Mizoe et al.

(10) Patent No.: US 12,173,720 B2
(45) Date of Patent: Dec. 24, 2024

(54) IDENTIFICATION METHOD AND AIR BLOWING SYSTEM

(71) Applicant: Panasonic Intellectual Property Management Co., Ltd., Osaka (JP)

(72) Inventors: Hajime Mizoe, Osaka (JP); Mineaki Isoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 17/905,139

(22) PCT Filed: Jan. 29, 2021

(86) PCT No.: PCT/JP2021/003192
§ 371 (c)(1),
(2) Date: Aug. 26, 2022

(87) PCT Pub. No.: WO2021/176905
PCT Pub. Date: Sep. 10, 2021

(65) Prior Publication Data
US 2023/0093213 A1    Mar. 23, 2023

(30) Foreign Application Priority Data
Mar. 5, 2020   (JP) .................. 2020-038246

(51) Int. Cl.
 *F04D 27/00* (2006.01)
 *F04B 51/00* (2006.01)
 *F04D 25/06* (2006.01)

(52) U.S. Cl.
CPC .......... *F04D 27/001* (2013.01); *F04D 25/06* (2013.01); *F04D 27/004* (2013.01); *F04B 51/00* (2013.01)

(58) Field of Classification Search
CPC ...... F04D 27/001; F04D 27/004; F04D 25/06; F04B 51/00
See application file for complete search history.

(56) References Cited

U.S. PATENT DOCUMENTS

| | | | | |
|---|---|---|---|---|
| 10,866,006 B2* | 12/2020 | Lambert | ............... | H02P 27/026 |
| 2013/0054047 A1* | 2/2013 | Uhlmann | ............... | G06F 1/206 |
| | | | | 700/300 |

(Continued)

FOREIGN PATENT DOCUMENTS

| JP | 10-077993 | 3/1998 |
|---|---|---|
| JP | 2013-104365 | 5/2013 |

OTHER PUBLICATIONS

International Search Report of PCT application No. PCT/JP2021/003192 dated Apr. 6, 2021.

*Primary Examiner* — Charles G Freay
(74) *Attorney, Agent, or Firm* — Rimon P.C.

(57) ABSTRACT

An identification method that identifies a type of a fan motor unit in an air blowing system that includes: a fan motor unit including a motor, a fan, and a casing; and a controller that controls the fan motor unit. The fan motor unit blows air to the outside. The identification method includes: a first step of the controller outputting, to the fan motor unit, a first air flow rate instruction that is output at a time of performing control to cause the fan motor unit to operate normally; a second step of the controller acquiring a first speed notification that is output from the fan motor unit in response to the outputting of the first air flow rate instruction; and a third step of the controller identifying, based on the first air flow rate instruction and the first speed notification, a type of the fan motor unit and outputting a type identification signal indicating the identified type.

8 Claims, 17 Drawing Sheets

(56) References Cited

U.S. PATENT DOCUMENTS

2014/0028292 A1  1/2014  Huang et al.
2020/0356150 A1* 11/2020  Chuang .................... H03K 7/08

* cited by examiner

FIG. 22

| DETAILS OF ABNORMALITY | PHENOMENON | MOVEMENT OF OPERATING POINT | CHANGE IN RELATIONSHIP BETWEEN Si AND FP |
|---|---|---|---|
| SEPARATOR BETWEEN CELL BATTERIES IN BATTERY PACK COMES OFF | AIR-FLOW RESISTANCE DECREASES | MOVES TOWARD NON-LINEAR REGION T2 | |
| DUCT COMES OFF FROM BATTERY PACK | AIR-FLOW RESISTANCE DECREASES | MOVES TOWARD NON-LINEAR REGION T2 | |
| OBJECT IS CLOGGED BETWEEN CELL BATTERIES IN BATTERY PACK | AIR-FLOW RESISTANCE INCREASES | MOVES TOWARD LINEAR REGION T1 | |
| OBJECT IS CLOGGED IN DUCT | AIR-FLOW RESISTANCE INCREASES | MOVES TOWARD LINEAR REGION T1 | |

IDENTIFICATION METHOD AND AIR BLOWING SYSTEM

CROSS-REFERENCE TO RELATED APPLICATIONS

This application is a U.S. national stage application of the PCT International Application No. PCT/JP2021/003192 filed on Jan. 29, 2021, which claims the benefit of foreign priority of Japanese patent application 2020-038246 filed on Mar. 5, 2020.

TECHNICAL FIELD

The present disclosure relates to an identification method for identifying a type of a fan motor unit, and an air blowing system including the fan motor unit.

BACKGROUND ART

PTL 1 describes a fan motor unit that includes: a motor; a fan that is rotated by rotation of the motor; and a casing covering at least a part of the fan and that blows air to the outside.

Conventionally, an air blowing system is known that includes a fan motor unit and a controller that controls the fan motor unit. The controller outputs to the fan motor unit an air flow rate instruction for controlling an air flow rate of air blown by the fan motor unit, thereby achieving air blowing at a desired air flow rate by the fan motor unit.

In general, in a fan motor unit, a relationship between an air flow rate instruction that is input and an air flow rate of blown air is different for each type of fan motor unit.

Therefore, in order to achieve air blowing at a desired air flow rate in an air blowing system, a controller needs to output an appropriate air flow rate instruction in accordance with the type of the fan motor unit.

CITATION LIST

Patent Literature

PTL 1: Unexamined Japanese Patent Publication No. 2013-104365

SUMMARY

Therefore, an object of the present disclosure is to provide an identification method for identifying a type of a fan motor unit without outputting, by a controller, a special signal for identifying the type of the fan motor unit, and is to provide an air blowing system and the like capable of performing the identification method.

An identification method, according to one aspect of the present disclosure, for identifying a type of a fan motor unit in an air blowing system. The air blowing system includes: the fan motor unit including a motor, a fan that rotates by rotation of the motor, and a casing that covers at least a part of the fan; and a controller that controls the fan motor unit. The fan motor unit blows air to the outside. The controller outputs, to the fan motor unit, an air flow rate instruction for controlling an air flow rate of the air blown by the fan motor unit, and the fan motor unit outputs, to the controller, a speed notification indicating a rotation state of the motor. The identification method includes: a first step of the controller outputting, to the fan motor unit, a first air flow rate instruction that is output at a time of performing control to cause the fan motor unit to operate normally; a second step of the controller acquiring a first speed notification that is output from the fan motor unit in response to the outputting of the first air flow rate instruction; and a third step of the controller identifying, based on the first air flow rate instruction and the first speed notification, a type of the fan motor unit and outputting a type identification signal indicating the identified type.

An air blowing system according to another aspect of the present disclosure includes: a fan motor unit that includes a motor, a fan that rotates by rotation of the motor, and a casing that covers at least a part of the fan; and a controller that controls the fan motor unit. The fan motor unit blows air to the outside. The controller outputs, to the fan motor unit, an air flow rate instruction for controlling an air flow rate of the air blown by the fan motor unit, and the fan motor unit outputs, to the controller, a speed notification indicating a rotation state of the motor. In a case where the controller has output, to the fan motor unit, a first air flow rate instruction that is output at a time of performing control to cause the fan motor unit to operate normally, when a first speed notification is output from the fan motor unit in response to the first air flow rate instruction, the controller identifies, based on the first air flow rate instruction and the first speed notification, a type of the fan motor unit and outputs a type identification signal indicating the identified type.

There is provided an identification method in which a controller identifies a type of a fan motor unit without outputting a special signal for identifying the type of the fan motor unit, and there is provided an air blowing system that can perform the identification method.

BRIEF DESCRIPTION OF THE DRAWINGS

FIG. 22 is a schematic diagram illustrating how a relationship between an air flow rate instruction and a speed notification changes due to an abnormality related to a fan motor unit according to the fourth exemplary embodiment.

Figure 1:
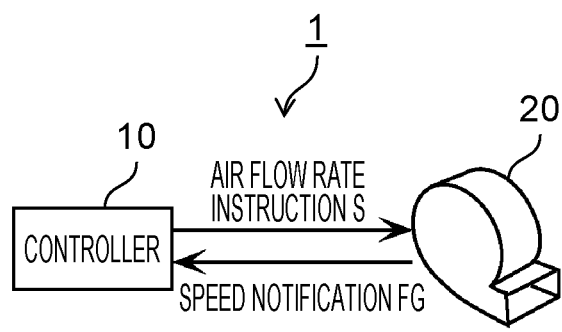
FIG. 1 is a block diagram illustrating a configuration example of an air blowing system according to a first exemplary embodiment.

DESCRIPTION OF PREFERRED EMBODIMENTS (How One Aspect of the Present Disclosure has been Conceived)

An air blowing system for cooling a secondary battery is mounted on a vehicle equipped with a large-capacity secondary battery such as a hybrid vehicle or an electric vehicle. The air blowing system includes: a fan motor unit that blows air into a battery pack that stores a secondary battery; and an electronic control unit (ECU) that functions as a controller that controls the fan motor unit.

The ECU outputs, to the fan motor unit, an air flow rate instruction for controlling an air flow rate of air blown by the fan motor unit, in accordance with a temperature in the battery pack detected by a temperature sensor disposed in the battery pack.

In general, in a fan motor unit, a relationship between an air flow rate instruction that is input and an air flow rate of blown air is different for each type of fan motor unit.

Therefore, in order to achieve air blowing at a desired air flow rate, the ECU needs to output an appropriate air flow rate instruction in accordance with a type of the fan motor unit.

For example, if the fan motor unit includes an interface that outputs, when a special signal for identifying the type of the fan motor unit is output from the ECU, an identification signal for identifying the type of the fan motor unit to the ECU in response to the signal, the ECU can identify the type of the fan motor unit by outputting the special signal.

However, on the other hand, it is desired that the fan motor unit used in an air blowing system is not limited to a specific fan motor unit having a special interface but is a general-purpose fan motor unit.

Therefore, the inventors have extensively conducted studies and experiments on an identification method as described above for identifying a type of a fan motor unit by a controller (for example, an ECU) without outputting a special signal for identifying the type of the fan motor unit. As a result, the inventors have conceived the following identification method, an air blowing system, and the like capable of performing the identification method.

An identification method, according to one aspect of the present disclosure, for identifying a type of a fan motor unit in an air blowing system. The air blowing system includes: the fan motor unit including a motor, a fan that rotates by rotation of the motor, and a casing that covers at least a part of the fan; and a controller that controls the fan motor unit. The fan motor unit blows air to the outside. The controller outputs, to the fan motor unit, an air flow rate instruction for controlling an air flow rate of the air blown by the fan motor unit, and the fan motor unit outputs, to the controller, a speed notification indicating a rotation state of the motor. The identification method includes: a first step of the controller outputting, to the fan motor unit, a first air flow rate instruction that is output at a time of performing control to cause the fan motor unit to operate normally; a second step of the controller acquiring a first speed notification that is output from the fan motor unit in response to the outputting of the first air flow rate instruction; and a third step of the controller identifying, based on the first air flow rate instruction and the first speed notification, a type of the fan motor unit and outputting a type identification signal indicating the identified type.

By the above identification method, the controller can identify the type of the fan motor unit by outputting to the fan motor unit the first air flow rate instruction that is output at a time of performing control to cause the fan motor unit to operate normally.

As described above, the above identification method makes it possible to identify the type of the fan motor unit without outputting a special signal for identifying the type of the fan motor unit.

The controller may be configured as follows. The controller further holds correspondence relationship information representing a correspondence relationship between the air flow rate instruction and the speed notification for each of a plurality of types of fan motor units. In the third step, when a correspondence relationship between the first air flow rate instruction and the first speed notification corresponds, based on the correspondence relationship information, to one type of fan motor unit of the plurality of types of fan motor units, the controller outputs the type identification signal for identifying the one type of fan motor unit.

As a result, when a type of a new fan motor unit is added to an identification target, the type can be added by updating the correspondence relationship information held by the controller.

The third step may further include a fourth step of, when a correspondence relationship between the first air flow rate instruction and the first speed notification does not correspond, based on the correspondence relationship information, to any of the plurality of types of fan motor units, the controller outputting an abnormality detection signal indicating that an abnormality related to the fan motor unit has been detected.

As a result, an abnormality related to the fan motor unit is quickly found.

The following configuration may be employed. Rotation of the motor is controlled by pulse width modulation (PWM) control; the air flow rate instruction is a PWM duty signal for controlling rotation of the motor by PWM control; and the speed notification is a pulse signal having a frequency of n/2 times a rotation frequency of the motor, supposing that a number of poles of the motor is n, where n is an integer more than or equal to 2.

This configuration makes it possible to output the type identification signal, based on a relationship between the PWM duty signal that is output by the controller and a pulse signal that is output by the fan motor unit.

In the first step, the controller may output the first air flow rate instruction including a duty ratio of the PWM duty signal in a range where a relationship between duty ratio of the PWM duty signal and frequency of the pulse signal is a linear relationship.

As a result, the type identification signal can be output relatively easily.

An air blowing system according to one aspect of the present disclosure includes: a fan motor unit that includes a motor, a fan that rotates by rotation of the motor, and a casing that covers at least a part of the fan; and a controller that controls the fan motor unit. The fan motor unit blows air to the outside. The controller outputs, to the fan motor unit, an air flow rate instruction for controlling an air flow rate of the air blown by the fan motor unit, and the fan motor unit outputs, to the controller, a speed notification indicating a rotation state of the motor. In a case where the controller has output, to the fan motor unit, a first air flow rate instruction that is output at a time of performing control to cause the fan motor unit to operate normally, when a first speed notification is output from the fan motor unit in response to the first air flow rate instruction, the controller outputs, based on the first air flow rate instruction and the first speed notification, a type identification signal for identifying a type of the fan motor unit.

With the above air blowing system, the controller can identify the type of the fan motor unit by outputting, to the fan motor unit, the first air flow rate instruction that is output at a time of performing control to cause the fan motor unit to operate normally.

As described above, the above air blowing system makes it possible to identify the type of the fan motor unit without outputting a special signal for identifying the type of the fan motor unit.

The controller may further hold correspondence relationship information representing a correspondence relationship between the air flow rate instruction and the speed notification for each of a plurality of types of fan motor units. In addition, when a correspondence relationship between the first air flow rate instruction and the first speed notification corresponds, based on the correspondence relationship information, to one type of fan motor unit of the plurality of types of fan motor units, the controller may output the type identification signal for identifying the one type of fan motor unit.

As a result, when a type of a new fan motor unit is added to the identification target, the type can be added by updating the correspondence relationship information held by the controller.

Furthermore, when the correspondence relationship between the first air flow rate instruction and the first speed notification does not correspond, based on the correspondence relationship information, to any of the plurality of types of fan motor units, the controller may output an abnormality detection signal indicating that an abnormality related to the fan motor unit has been detected.

As a result, an abnormality related to the fan motor unit is quickly found.

Hereinafter, a specific example of the air blowing system according to one aspect of the present disclosure will be described with reference to the drawings. Note that the exemplary embodiments described below each illustrate a specific example of the present disclosure. Numerical values, shapes, constituent components, arrangement positions and connection modes of the constituent components, steps, order of the steps, and the like illustrated in the following exemplary embodiments are merely examples, and therefore are not intended to limit the present disclosure. Each of the drawings is a schematic diagram, and is not necessarily precisely illustrated.

Note that the comprehensive or specific aspects of the present disclosure may be implemented by a system, a method, an integrated circuit, a computer program, or a computer-readable recording medium such as a compact disk read-only memory (CD-ROM), or may be implemented by any combination of a system, a method, an integrated circuit, a computer program, and a recording medium.

First Exemplary Embodiment

<Configuration>

FIG. 1 is a block diagram illustrating a configuration example of air blowing system 1 according to a first exemplary embodiment.

As illustrated in FIG. 1, air blowing system 1 includes fan motor unit 20 that blows air to the outside, and controller 10 that controls fan motor unit 20.

Controller 10 outputs, to fan motor unit 20, an air flow rate instruction S for controlling an air flow rate of the air blown by fan motor unit 20.

Fan motor unit 20 blows air in accordance with the air flow rate instruction S that is output from controller 10. Fan motor unit 20 has a motor (motor 21 to be described later, see FIG. 3) therein and outputs a speed notification FG indicating a rotation state of the motor to controller 10.

Figure 2:
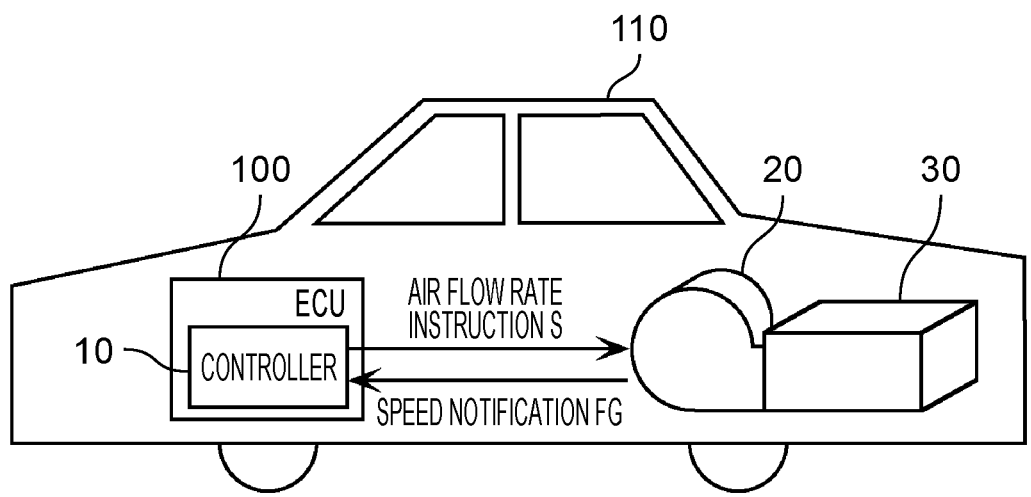
FIG. 2 is a schematic diagram illustrating a usage example of the air blowing system according to the first exemplary embodiment.

FIG. 2 is a schematic diagram illustrating a usage example of air blowing system 1.

As illustrated in FIG. 2, as an example, air blowing system 1 is mounted on electric vehicle 110 having a large-capacity secondary battery as a power source. Air blowing system 1 is used to cool the secondary battery by blowing air into battery pack 30 that houses the secondary battery. In this example, controller 10 is implemented by ECU 100 that controls electric vehicle 110. More specifically, controller 10 is implemented by a processor (not shown) included in ECU 100 executing a program stored in a memory (not illustrated) included in ECU 100.

Figure 3:
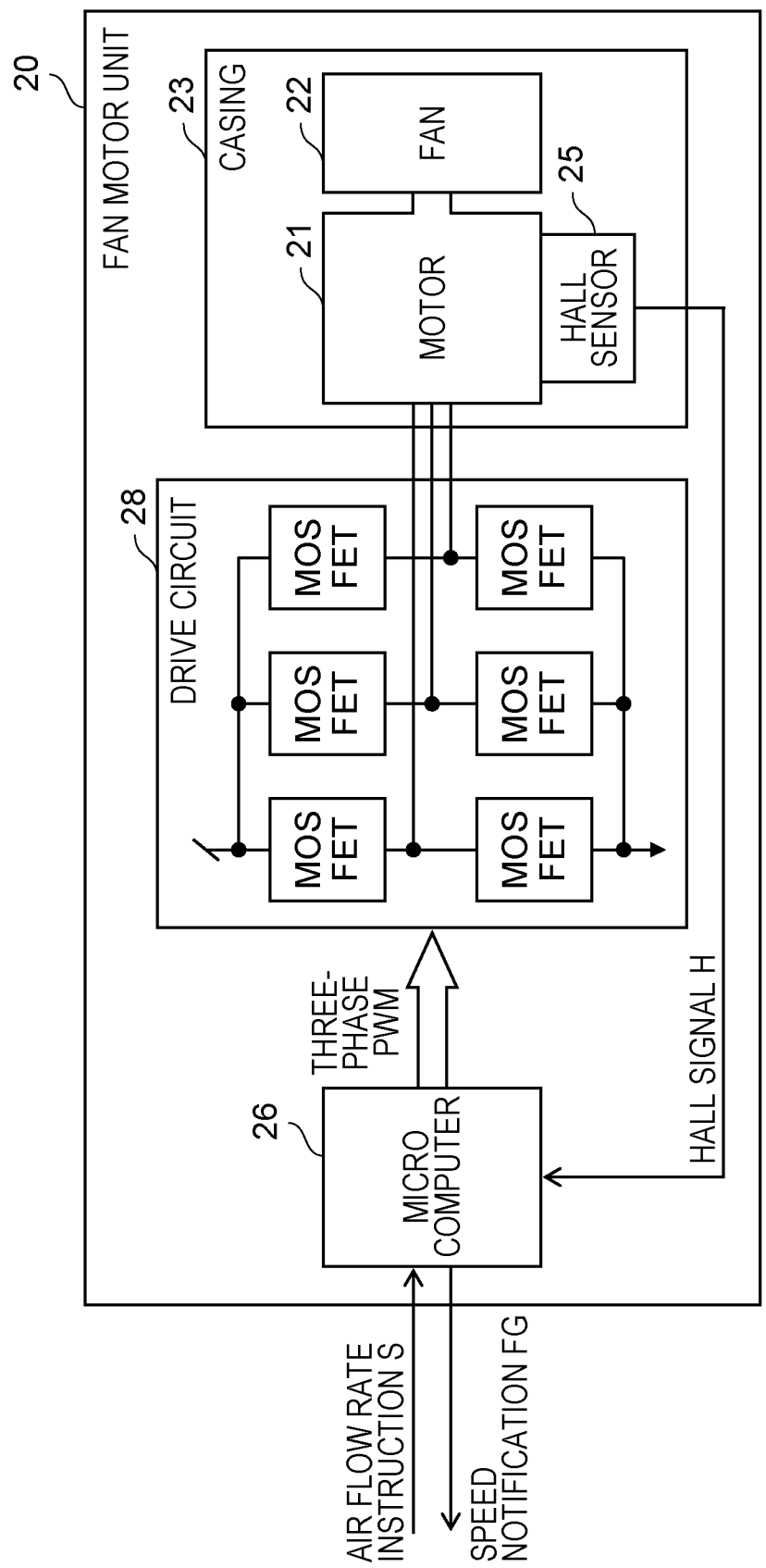
FIG. 3 is a block diagram illustrating a configuration example of a fan motor unit according to the first exemplary embodiment.

FIG. 3 is a block diagram illustrating a configuration example of fan motor unit 20.

As illustrated in FIG. 3, fan motor unit 20 has motor 21, fan 22, casing 23, Hall sensor 25, microcomputer (microcontroller) 26, and drive circuit 28.

Motor 21 rotates, being driven by three-phase AC power (to be described later) that is output from drive circuit 28.

Fan 22 is attached to a rotation shaft of motor 21 and rotates by rotation of motor 21. Therefore, fan 22 generates an air flow when motor 21 rotates.

Casing 23 covers at least a part of fan 22. Casing 23 has a duct (not shown) through which the air flow generated by fan 22 is blown to the outside. With this configuration, fan motor unit 20 blows air generated by fan 22 to the outside through the duct.

Hall sensor 25 is a sensor that detects a change of a magnetic field in motor 21, and outputs a Hall signal H.

Figure 4:
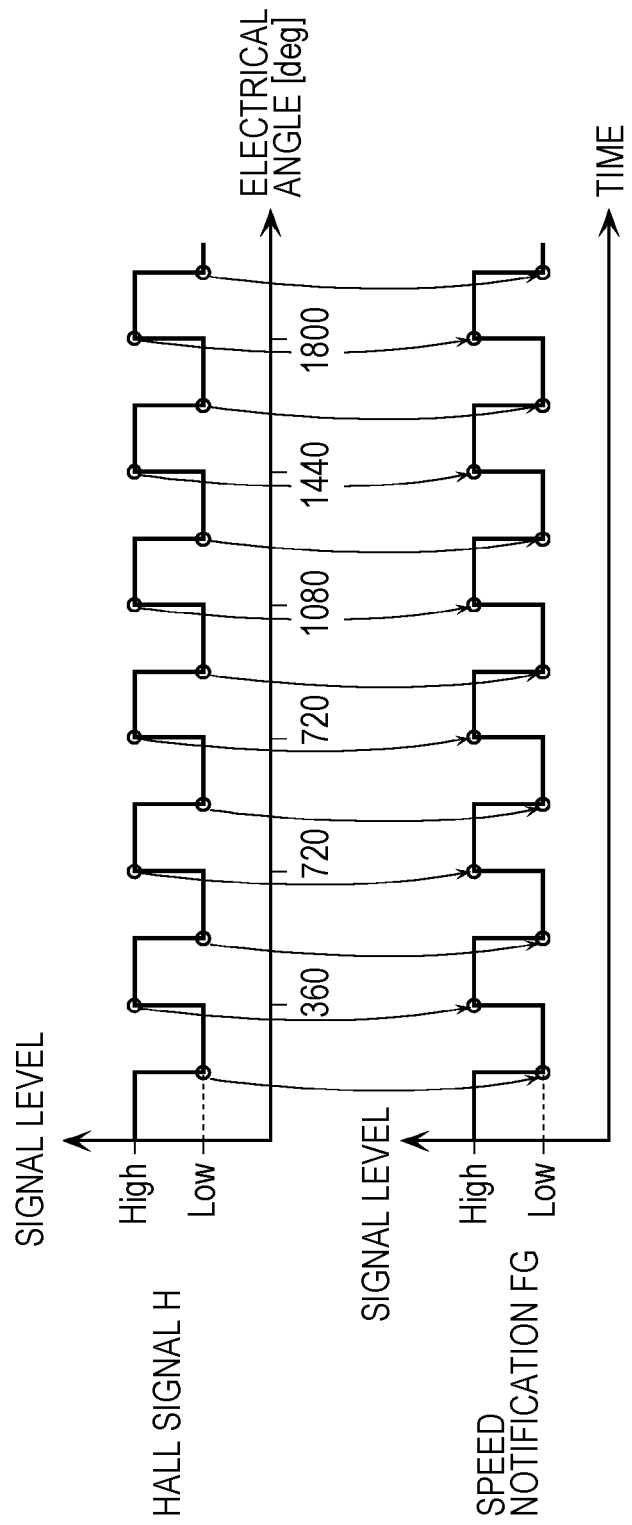
FIG. 4 is a schematic diagram illustrating an example of a waveform of a Hall signal that is output from a Hall sensor and an example of a waveform of a speed notification according to the first exemplary embodiment.

FIG. 4 is a schematic diagram illustrating an example of a waveform of the Hall signal H that is output from Hall sensor 25 and an example of a waveform of the speed notification FG (frame ground) according to the first exemplary embodiment. The waveform of the Hall signal H will be described here, and the waveform of the speed notification FG will be described later.

As illustrated in FIG. 4, the Hall signal H is a pulse signal whose signal level alternately changes between "High" level and "Low" level every time an electrical angle of the magnetic field in rotating motor 21 changes by 180 degrees. The electrical angle of the magnetic field in rotating motor 21 is n/2 times a rotation angle of a rotor of motor 21 when the number of poles of motor 21 is supposed to be n, where n is an integer more than or equal to 2. Therefore, the Hall signal H is a pulse signal having a frequency of n/2 times the rotation frequency of the rotor of motor 21.

With reference again to FIG. 3, the description of fan motor unit 20 will be continued.

Microcomputer 26 acquires the air flow rate instruction S that is output from controller 10, converts the acquired air flow rate instruction S into a three-phase pulse width modulation (PWM) signal for driving motor 21, and outputs the converted signal to drive circuit 28.

Figure 5:
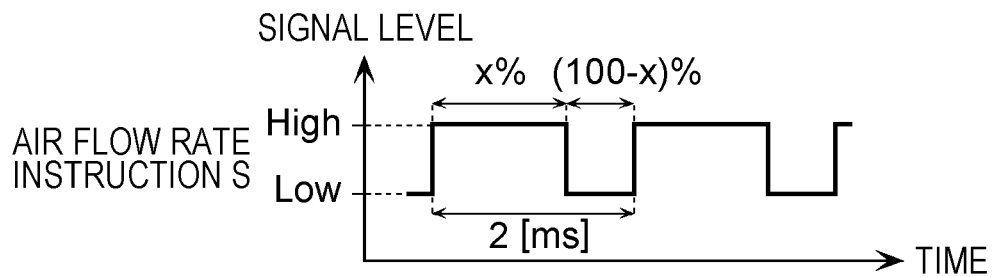
FIG. 5 is a schematic diagram illustrating an example of a waveform of an air flow rate instruction acquired by a microcomputer (microcontroller), that is, an air flow rate instruction that is output by a controller according to the first exemplary embodiment.

FIG. 5 is a schematic diagram illustrating an example of a waveform of the air flow rate instruction S acquired by microcomputer 26, in other words, a waveform of the air flow rate instruction S that is output by controller 10 according to the first exemplary embodiment.

As illustrated in FIG. 5, the air flow rate instruction S is a PWM duty signal. Here, the air flow rate instruction S is a PWM duty signal in which one cycle is 2 ms and the duty ratio is x percent.

With reference again to FIG. 3, the description of fan motor unit 20 will be continued.

Microcomputer 26 further acquires the Hall signal H that is output from Hall sensor 25, converts the acquired Hall signal H into the speed notification FG, and outputs the speed notification FG to controller 10.

As illustrated in FIG. 4, the speed notification FG is a signal whose signal level changes from "High" level to "Low" level at a timing when the signal level of the Hall signal H changes from "High" level to "Low" level and whose signal level changes from "Low" level to "High" level at a timing when the signal level of the Hall signal H changes from "Low" level to "High" level. Therefore, the speed notification FG is a pulse signal having a frequency of 2/n times the rotation frequency of the rotor of motor 21.

Note that above-described microcomputer 26 can also be implemented by another hardware, for example, a motor driving integrated circuit, which is a so-called driver integrated circuit (IC), or software.

The above description has described an example in which Hall sensor 25 is used as a means for detecting the rotation state of motor 21. The means for detecting the rotation state of motor 21 may be another method as long as the rotation state of motor 21 can be detected. For example, as in a sensorless drive brushless motor, the following method or the like may be used without using a Hall sensor: a method in which an induced voltage is detected, or a method in which a current flowing through a motor is detected. In other words, it is not always necessary to use Hall sensor 25 in order to detect the rotation state of motor 21.

With reference again to FIG. 3, the description of fan motor unit 20 will be continued.

Drive circuit 28 generates three-phase AC power by switching DC power by using the three-phase PWM signal that is output from the microcomputer 26, and drives motor 21 with the generated three-phase AC power.

With the configuration of fan motor unit 20, fan motor unit 20 blows air in accordance with the air flow rate instruction S, which is output from controller 10, for controlling the air flow rate of the air blown by fan motor unit 20, and outputs the speed notification FG indicating the rotation state of motor 21 to controller 10.

Figure 6:
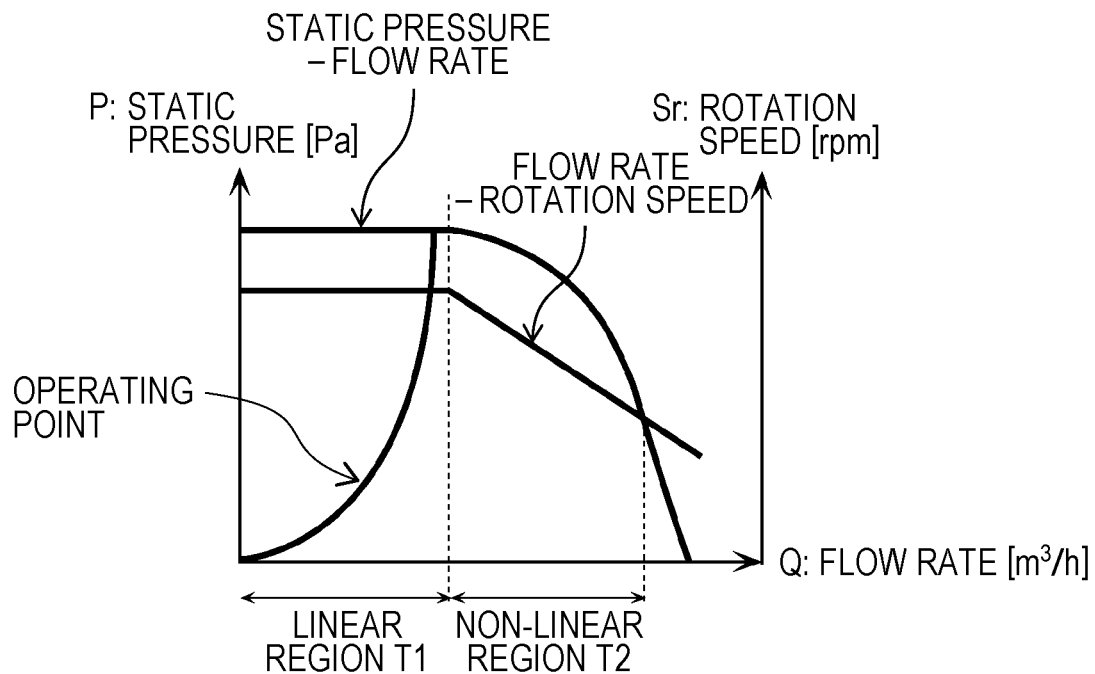
FIG. 6 is a schematic diagram illustrating, with respect to the first exemplary embodiment, a relationship between static pressure of the fan motor unit and flow rate, a relationship between rotation speed of the motor and flow rate, and an operating point of the fan motor unit.

FIG. 6 is a schematic diagram illustrating, with respect to the first exemplary embodiment, a relationship between a static pressure P [Pa] of fan motor unit 20 and a flow rate Q [m³/h], a relationship between a rotation speed Sr [rpm] of motor 21 and a flow rate Q [m³/h], and an operating point of fan motor unit 20.

As illustrated in FIG. 6, when the operating point of fan motor unit 20 is in a region where the static pressure P is relatively high, a load of motor 21 is relatively low, so that a relationship between the rotation speed Sr and the flow rate Q is a linear relationship. Hereinafter, an operation region of fan motor unit 20 where the relationship between the rotation speed Sr and the flow rate Q is a linear relationship is also referred to as "linear region T1". In contrast, when the operating point of fan motor unit 20 is in a region where the static pressure P is relatively low, the load of motor 21 is relatively high, so that the relationship between the rotation speed Sr and the flow rate Q is not a linear relationship. Hereinafter, an operation region of fan motor unit 20 where the relationship between the rotation speed Sr and the flow rate Q is not a linear relationship is also referred to as "non-linear region T2". The first exemplary embodiment will describe a case where the operating point of fan motor unit 20 is limited to be in linear region T1.

Figure 7:
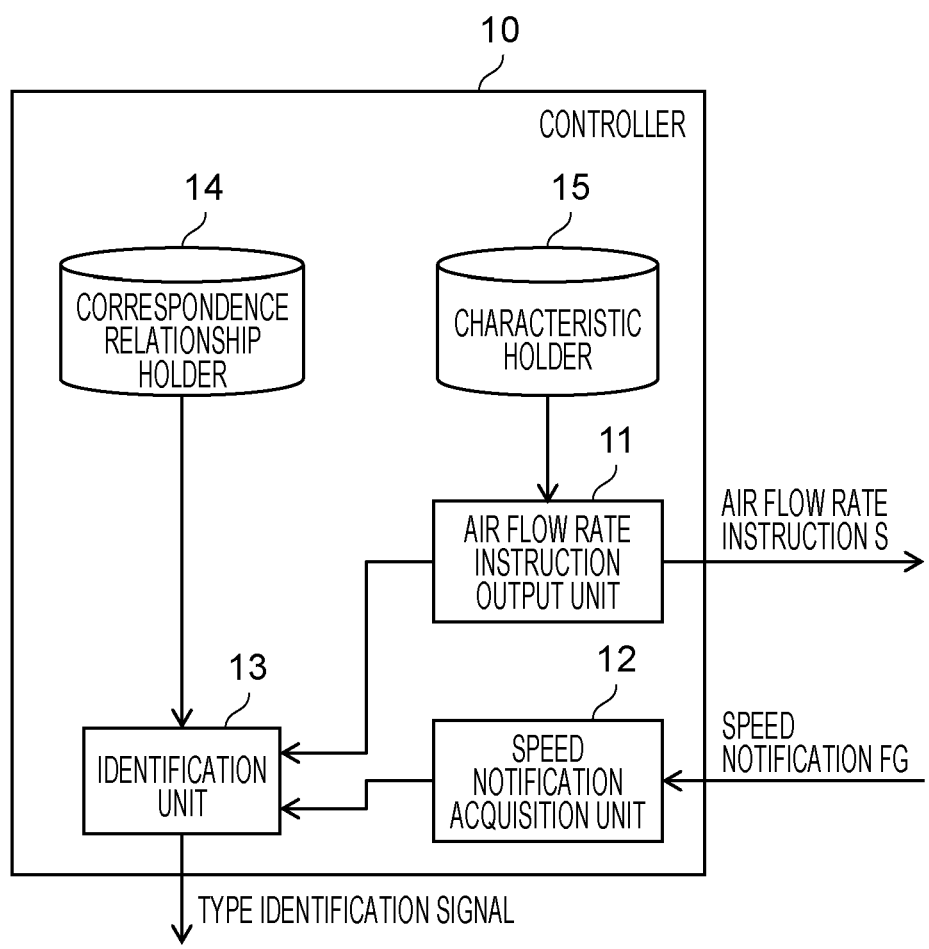
FIG. 7 is a block diagram illustrating a configuration example of the controller according to the first exemplary embodiment.

FIG. 7 is a block diagram illustrating a configuration example of controller 10 according to the first exemplary embodiment.

As illustrated in FIG. 7, controller 10 has air flow rate instruction output unit 11, speed notification acquisition unit 12, identification unit 13, correspondence relationship holder 14, and characteristic holder 15. Controller 10 is implemented by a computer device that includes, for example, a processor (not illustrated) and a memory (not illustrated) and in which the processor executes a program stored in the memory.

Characteristic holder 15 stores, for each of the types of the plurality of fan motor units, "air flow rate instruction-flow rate characteristics" representing a relationship between a duty ratio [%] in the air flow rate instruction S that is output to the fan motor unit and the flow rate Q [m³/h] of the air blown by the fan motor unit in accordance with the air flow rate instruction S.

Air flow rate instruction output unit 11 determines the air flow rate of the air to be blown by fan motor unit 20. Air flow rate instruction output unit 11 refers to the "air flow rate instruction-flow rate characteristics", stored in characteristic holder 15, with respect to the type of fan motor unit 20 currently connected to controller 10, and generates the air flow rate instruction S for causing fan motor unit 20 to blow air at the determined air flow rate. Air flow rate instruction output unit 11 outputs the generated air flow rate instruction S to fan motor unit 20.

For example, when a temperature sensor for detecting a temperature is disposed in battery pack 30, air flow rate instruction output unit 11 may determine the air flow rate of the air blown by fan motor unit 20, depending on the temperature in the battery pack detected by the temperature sensor. Alternatively, for example, when controller 10 has a function of receiving an operation by a user who uses air blowing system 1, air flow rate instruction output unit 11 may determine the air flow rate of the air to be blown by fan motor unit 20, according to the operation made by the user and received by controller 10.

For example, when controller 10 has a function of receiving an operation by a user who uses air blowing system 1, air flow rate instruction output unit 11 may identify the type of fan motor unit 20 currently connected to controller 10, according to the operation made by the user and received by controller 10. Alternatively, air flow rate instruction output unit 11 may identify the type of fan motor unit 20 currently connected to controller 10, on the basis of a type identification signal (to be described later) that is output from identification unit 13. The type identification signal that is output from controller 10 is output in the ECU as illustrated in FIG. 2, for example. Specifically, the type identification signal is output to a determination unit (not illustrated) or the like provided in the ECU.

Speed notification acquisition unit 12 acquires the speed notification FG that is output from fan motor unit 20.

Correspondence relationship holder 14 holds a correspondence table representing a correspondence relationship between the air flow rate instruction S and the speed notification FG for each of the plurality of types of fan motor units. The correspondence table is previously created. The first exemplary embodiment will describe, as an example, a case where a plurality of types of fan motor units targeted by the correspondence table are different from each other in at least one of a shape of the fan and a shape of the casing, but the numbers of poles of the motors are equal to each other. That is, the plurality of types of fan motor units targeted by the correspondence table held by correspondence relationship holder 14 are different from each other in at least one of the shape of the fan and the shape of the casing, but the numbers of poles of the motors are equal to each other.

Hereinafter, a specific example of how to create the correspondence table held by correspondence relationship holder 14 will be described with reference to the drawings. Hereinafter, as an example, a description will be given supposing that the plurality of types of fan motor units are the following two types of fan motor units: fan motor unit A (hereinafter, also referred to as "unit A") having a motor with 10 poles; and a fan motor unit B (hereinafter, also referred to as "unit B") having a motor with 10 poles. However, the fan motor units are not necessarily limited to the two types of fan motor units of units A and B as long as the plurality of types of fan motor units are different from each other in at least one of the shape of the fan and the shape of the casing and, at the same time, the numbers of poles of the motors are equal to each other.

The duty ratio of the air flow rate instruction S and the rotation speed Sr of each motor have the following relationship. Specifically, when the duty ratio is a minimum duty ratio Smin, motor 21 rotates at a controllable minimum rotation speed Srmin. When the duty ratio is a maximum duty ratio Smax, motor 21 rotates at a controllable maximum rotation speed Srmax.

Hereinafter, a description will be given on an example of motor 21 in which a controllable rotation speed range of the motor, that is, a range from the minimum rotation speed Srmin to the maximum rotation speed Srmax inclusive can be achieved in a range of a minimum duty ratio of 10% to a maximum duty ratio of 90% inclusive. However, the minimum duty ratio and the maximum duty ratio for achieving the range from the minimum rotation speed Srmin to the maximum rotation speed Srmax do not have to be 10% and 90%, respectively. These values are calculated, as appropriate, from specifications of the motor to be used or the like.

Figure 8:
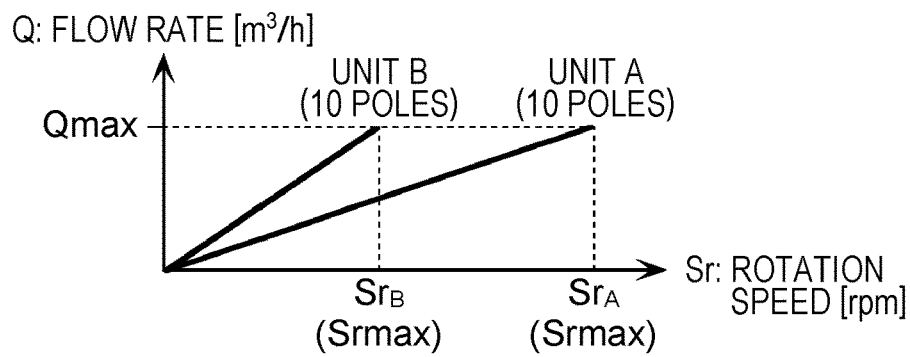
FIG. 8 is a schematic diagram illustrating relationships between rotation speed of a motor and flow rate in units A and B according to the first exemplary embodiment.

FIG. 8 is a schematic diagram illustrating relationships between the rotation speed Sr [rpm] of the motor and the flow rate Q [m³/h] in units A and B according to the first exemplary embodiment.

As described above, the operating points of units A and B are in linear region T1 (see FIG. 6). Therefore, as illustrated in FIG. 8, the relationship between the rotation speed Sr and the flow rate Q in each of units A and B is a linear relationship. On the other hand, since units A and B are different from each other in at least one of the shape of the fan and the shape of the casing, the flow rates Q are different from each other even when the motor rotates at the same rotation speed Sr in each of unit A and unit B.

First, as a first stage, a maximum flow rate required in air blowing system 1 is supposed to be Qmax, and a rotation speed $Sr_A$ of the motor for achieving the flow rate Qmax in unit A and a rotation number $Sr_B$ of the motor for achieving the flow rate Qmax in unit B are determined.

Next, as a second stage, with respect to unit A, the relationship between the air flow rate instruction S and the rotation speed Sr is determined so that the rotation speed Sr of the motor is $Sr_A$ (the above-described maximum rotation speed Srmax; the same applies hereinafter) when the duty ratio of the air flow rate instruction S is 90%. With respect to unit B, the relationship between the air flow rate instruction S and the rotation speed Sr is determined so that the rotation speed Sr of the motor is $Sr_B$ (the above-described maximum rotation speed Srmax) when the duty ratio of the air flow rate instruction S is 90%.

Figure 9:
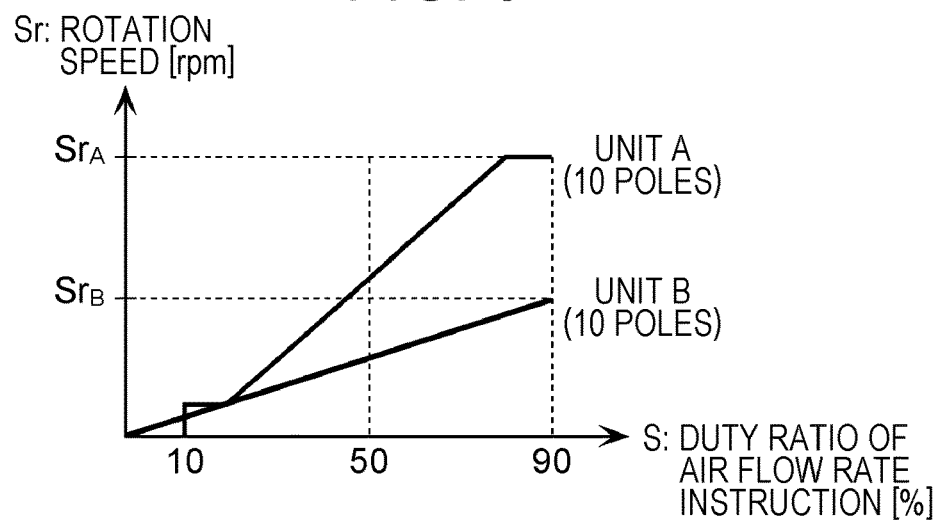
FIG. 9 is a schematic diagram illustrating relationships between duty ratio of an air flow rate instruction and rotation speed of a motor in units A and B that are determined in a second stage according to the first exemplary embodiment.

FIG. 9 is a schematic diagram illustrating the relationships between the duty ratio [%] of the air flow rate instruction S and the rotation speed Sr [rpm] of the motor in units A and B, which are determined in the second stage according to the first exemplary embodiment.

As described above, the relationship between the frequency of the speed notification FG, that is, the frequency of the Hall signal H and the rotation frequency of the motor is such that the frequency of the speed notification FG is equal to the rotation frequency of the motor×the number of poles of the motor (10 in this case)×½ times. Finally, as a third stage, by using this relationship, on the basis of the relationship between the duty ratio [%] of the air flow rate instruction S and the rotation speed Sr [rpm] of the motor in each of units A and B determined in the second stage, a relationship between the duty ratio [%] of the air flow rate instruction S and the frequency [Hz] of the speed notification FG in each of units A and B is calculated.

Figure 10:
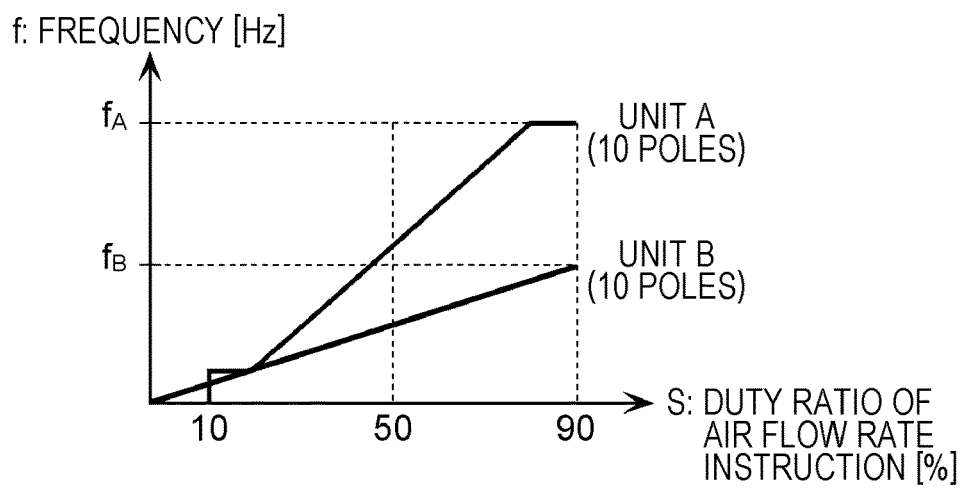
FIG. 10 is a schematic diagram illustrating relationships between duty ratio of an air flow rate instruction and frequency of a speed notification in units A and B that are determined in a third stage according to the first exemplary embodiment.

FIG. 10 is a schematic diagram illustrating the relationships between the duty ratio [%] of the air flow rate instruction S and the frequency [Hz] of the speed notification FG in units A and B, which are determined in the third stage according to the first exemplary embodiment.

Correspondence relationship holder 14 stores in advance a correspondence table indicating the relationship between the duty ratio [%] of the air flow rate instruction S and the frequency [Hz] of the speed notification FG in each of units A and B calculated in the third stage.

As illustrated in FIG. 10, the relationship between the duty ratio [%] of the air flow rate instruction S and the frequency [Hz] of the speed notification FG is a linear relationship. This is because, as described above, in air blowing system 1, the operating point of fan motor unit 20 is limited to be in linear region T1. As described above, air flow rate instruction output unit 11 outputs a first air flow rate instruction S having a duty ratio within a range in which there is a linear relationship between the duty ratio of the air flow rate instruction S, which is a PWM duty signal, and the frequency of the speed notification FG, which is a pulse signal.

With reference again to FIG. 7, the description of controller 10 will be continued.

In a case where air flow rate instruction output unit 11 has output, to fan motor unit 20, the first air flow rate instruction S that is output at a time of performing control to cause fan motor unit 20 to operate normally, when the first speed notification FG is output from fan motor unit 20 in response to the first air flow rate instruction S, identification unit 13 identifies the type of fan motor unit 20, on the basis of the first air flow rate instruction S and the first speed notification FG, and outputs the type identification signal indicating the identified type. More specifically, when, on the basis of the correspondence table held by correspondence relationship holder 14, the correspondence relationship between the first air flow rate instruction S and the first speed notification FG corresponds to one type of fan motor unit of the plurality of types of fan motor units targeted by the correspondence table, identification unit 13 identifies the one type of fan motor unit and outputs the type identification signal indicating the identified type. The type identification signal that is output from controller 10 is output in the ECU as illustrated in FIG. 2, for example. Specifically, the type identification signal is output to a determination unit (not illustrated) or the like provided in the ECU.

Here, the first air flow rate instruction S that is output at a time of performing control to cause fan motor unit 20 to normally operate refers to the air flow rate instruction S to be output by controller 10 to cause fan motor unit 20 to output air at a specific air flow rate of the air flow rates in a range defined in air blowing system 1.

Figure 11A:
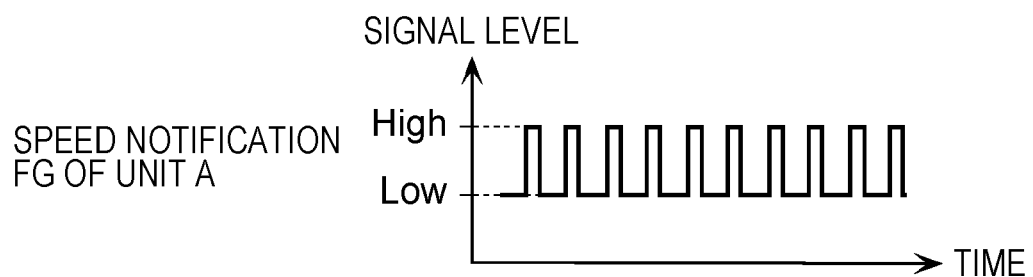
FIG. 11A is a schematic diagram illustrating a waveform of a first speed notification that is output from unit A in response to a first air flow rate instruction in a case where the first air flow rate instruction has been output to unit A by an air flow rate instruction output unit according to the first exemplary embodiment.
Figure 11B:
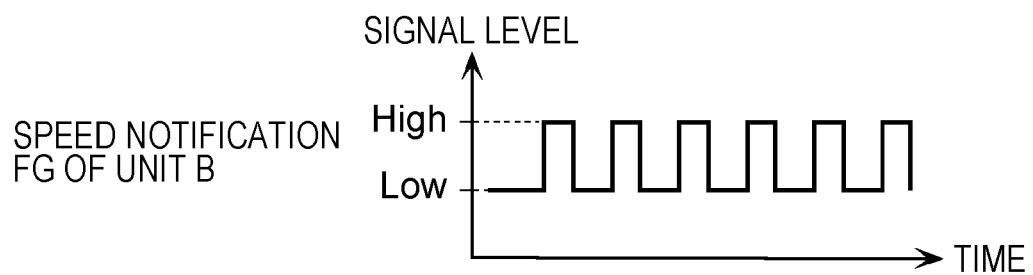
FIG. 11B is a schematic diagram illustrating a waveform of a first speed notification that is output from unit B in response to a first air flow rate instruction in a case where the first air flow rate instruction has been output to unit B by the air flow rate instruction output unit according to the first exemplary embodiment.

FIG. 11A is a schematic diagram illustrating a waveform of the first speed notification FG that is output from unit A in response to a first air flow rate instruction S in a case where the first air flow rate instruction S has been output to unit A by air flow rate instruction output unit 11 according to the first exemplary embodiment. FIG. 11B is a schematic diagram illustrating a waveform of the first speed notification FG that is output from unit B in response to a first air flow rate instruction S in a case where the first air flow rate instruction S has been output to unit B by air flow rate instruction output unit 11 according to the first exemplary embodiment.

As illustrated in FIGS. 11A and 11B, a frequency of the first speed notification FG is different between a case where fan motor unit 20 is unit A and a case where fan motor unit 20 is unit B.

On the basis of the correspondence table held in correspondence relationship holder 14, when the relationship between the first air flow rate instruction S and the first speed notification FG corresponds to unit A, identification unit 13 outputs the type identification signal for identifying unit A, and when the relationship between the first air flow rate instruction S and the first speed notification FG corresponds to unit B, identification unit 13 outputs the type identification signal for identifying unit B.

<Operation>

The operation performed by air blowing system 1 having the above configuration will be described below.

Air blowing system 1 performs a first identification process of outputting a type identification signal.

Figure 12:
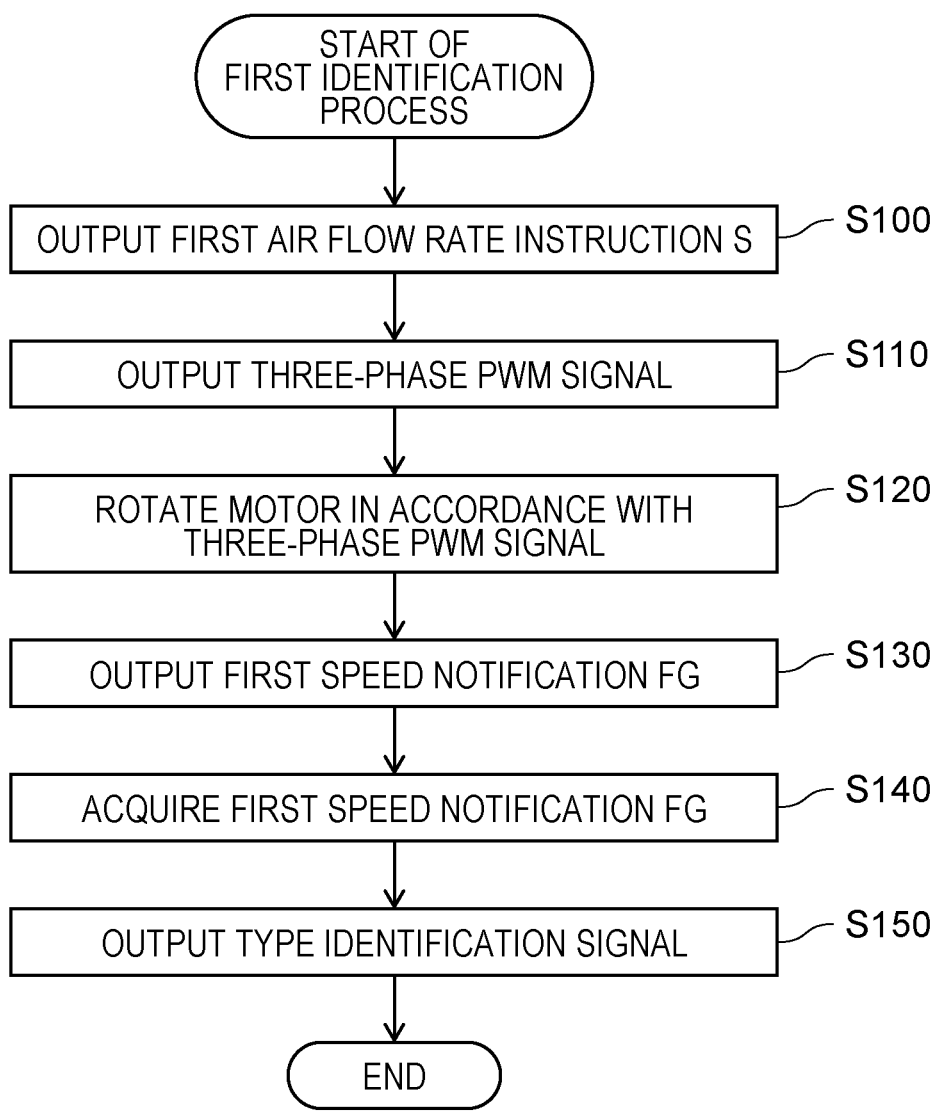
FIG. 12 is a flowchart of a first identification process according to the first exemplary embodiment.

FIG. 12 is a flowchart of the first identification process according to the first exemplary embodiment.

The first identification process may be started when a predetermined time has elapsed since air blowing system 1 is activated or when a replacement work of fan motor unit 20 is completed, and may be periodically started every predetermined period.

When the first identification process is started, air flow rate instruction output unit 11 outputs, to fan motor unit 20, a first air flow rate instruction S that is output at a time of performing control to cause fan motor unit 20 to normally operate (step S100).

When the first air flow rate instruction S is output, microcomputer (microcontroller) 26 acquires a first air flow rate instruction S. The microcomputer (microcontroller) 26 converts the acquired air flow rate instruction S into a three-phase PWM signal to drive motor 21. Microcomputer 26 outputs the converted three-phase PWM signal to drive circuit 28 (step S110).

When the three-phase PWM signal is output, drive circuit 28 generates three-phase AC power by switching DC power with the three-phase PWM signal. Drive circuit 28 drives motor 21 with the generated three-phase AC power. Then, motor 21 rotates in accordance with the three-phase PWM signal (step S120).

When motor 21 rotates, Hall sensor 25 detects a change in a magnetic field in motor 21 and outputs a first Hall signal H.

When the first Hall signal His output, microcomputer 26 acquires the first Hall signal H. The obtained first Hall signal H is converted into a first speed notification FG. Microcomputer 26 outputs the converted first speed notification FG to controller 10 (step S130).

When the first speed notification FG is output, speed notification acquisition unit 12 acquires the first speed notification FG (step S140).

When the first speed notification FG is acquired, identification unit 13 identifies the type of fan motor unit 20 on the basis of the first air flow rate instruction S and the first speed notification FG, and outputs a type identification signal indicating the identified type (step S150). At this time, when, on the basis of the correspondence table held in correspondence relationship holder 14, the correspondence relationship between the first air flow rate instruction S and the first speed notification FG corresponds to one type of fan motor unit of the plurality of types of fan motor units targeted by the correspondence table, identification unit 13 outputs a type identification signal for identifying the one type of fan motor unit.

When the process of step S150 is completed, air blowing system 1 ends the first identification process.

<Consideration>

Air blowing system 1 enables controller 10 to identify the type of fan motor unit 20 by outputting, to the fan motor unit, the first air flow rate instruction that is output at a time of performing control to cause fan motor unit 20 to normally operate.

As described above, air blowing system 1 makes it possible to identify the type of fan motor unit 20 without outputting a special signal for identifying the type of fan motor unit 20.

With air blowing system 1, when a type of a new fan motor unit is added to the identification target, the type can be added by updating the correspondence table held by correspondence relationship holder 14.

With air blowing system 1, as described above, controller 10 outputs the first air flow rate instruction S having a duty ratio within a range in which there is a linear relationship between the duty ratio of the air flow rate instruction S, which is a PWM duty signal, and the frequency of the speed notification FG, which is a pulse signal.

Therefore, controller 10 can output the type identification signal relatively easily.

Second Exemplary Embodiment

Hereinafter, an air blowing system according to a second exemplary embodiment will be described. In the description, with respect to the air blowing system according to the second exemplary embodiment, the components similar to those of air blowing system 1 according to the first exemplary embodiment are considered to have been already described; therefore, such similar components are assigned the same reference marks and detailed description thereof is omitted.

Air blowing system 1 according to the first exemplary embodiment is a configuration example that describes, as an example, a case where a plurality of types of fan motor units targeted by the correspondence table are different from each other in at least either of a shape of the fan and a shape of the casing, but the numbers of poles of the motors are equal to each other. In contrast, air blowing system 1 according to the second exemplary embodiment is a configuration example that describes, as an example, a case where a plurality of types of fan motor units targeted by the correspondence table have the same shape of the fan and the same shape of the casing, but the numbers of poles of the motors are different.

The second exemplary embodiment will describe, as an example, a case where the operating point of fan motor unit 20 is limited to be in linear region T1 similarly to the first exemplary embodiment.

The air blowing system according to the second exemplary embodiment is configured such that controller 10 of the air blowing system according to the first exemplary embodiment is changed to controller 10A according to the second exemplary embodiment.

Figure 13:
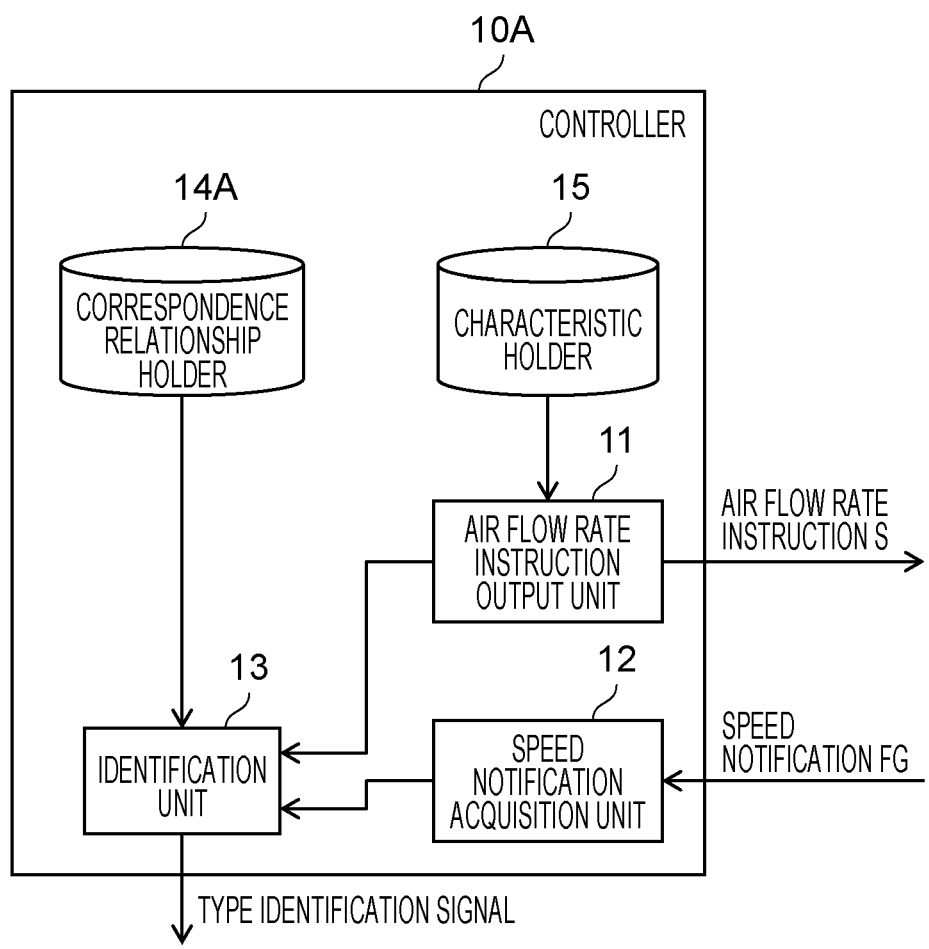
FIG. 13 is a block diagram illustrating a configuration example of a controller according to a second exemplary embodiment.

FIG. 13 is a block diagram illustrating a configuration example of controller 10A according to the second exemplary embodiment.

As illustrated in FIG. 13, controller 10A is modified from controller 10 according to the first exemplary embodiment. Controller 10A is configured such that correspondence relationship holder 14 is changed to correspondence relationship holder 14A.

Correspondence relationship holder 14A holds a correspondence table representing a correspondence relationship between the air flow rate instruction S and the speed notification FG for each of the plurality of types of fan motor units. The correspondence table is previously created. In the second exemplary embodiment, the plurality of types of fan motor units targeted by the correspondence table held by correspondence relationship holder 14A have the same shape of the fan and the same shape of the casing, but the numbers of poles of the motors are different.

Hereinafter, a specific example of how to create the correspondence table held by correspondence relationship holder 14A will be described with reference to the drawings. Hereinafter, as an example, a description will be given supposing that the plurality of types of fan motor units are the following two types of fan motor units: fan motor unit B (hereinafter, also referred to as "unit B") having a motor with 10 poles, and fan motor unit C (hereinafter, also referred to as "unit C") having a motor with 8 poles. However, the fan motor units are not necessarily limited to the two types of fan motor units of units B and C as long as the plurality of types of fan motor units have the same shape of the fan and the same shape of the casing and at the same time, the numbers of poles of the motors are different.

Figure 14:
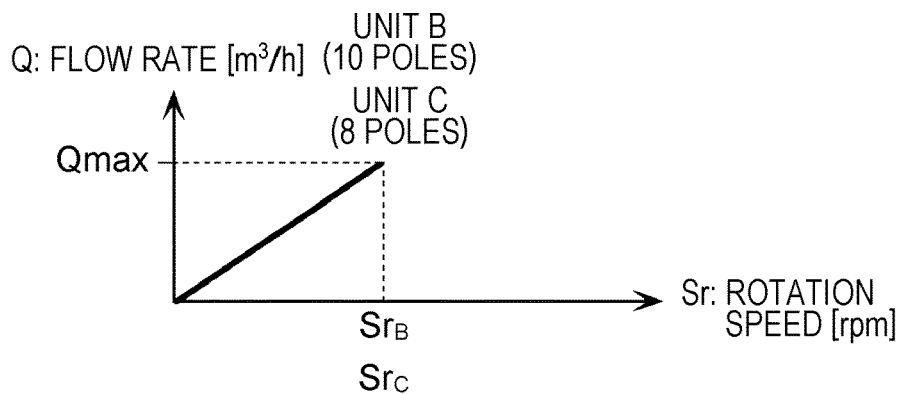
FIG. 14 is a schematic diagram illustrating relationships between rotation speed of a motor and flow rate in units B and C according to the second exemplary embodiment.

FIG. 14 is a schematic diagram illustrating relationships between the rotation speed Sr [rpm] of the motor and the flow rate Q [m³/h] in units B and C according to the second exemplary embodiment.

As described above, the operating points of units B and C are in linear region T1 (see FIG. 6). Therefore, as illustrated in FIG. 14, the relationship between the rotation speed Sr and the flow rate Q in each of units B and C is a linear relationship. On the other hand, units B and C have the same shape of the fan and the same shape of the casing; therefore, when the motor rotates at the same rotation speed Sr, the flow rates Q are identical to each other.

As a first stage, a maximum flow rate required in the air blowing system according to the second exemplary embodiment is supposed to be Qmax, and a rotation speed $Sr_B$ of the motor for achieving the flow rate Qmax in unit B and a rotation number $Sr_C$ of the motor for achieving the flow rate Qmax in unit C are determined. Since units B and C have the same shape of the fan and the same shape of the casing, $Sr_B$ and $Sr_C$ are equal to each other as illustrated in FIG. 14.

As a second stage, a relationship between the air flow rate instruction S and the rotation speed Sr is determined for unit B so that the rotation speed Sr of the motor is $Sr_B$ when the duty ratio of the air flow rate instruction S is 90%, and the relationship between the air flow rate instruction S and the rotation speed Sr is determined for the unit C so that the rotation speed Sr of the motor is $Sr_C$ when the duty ratio of the air flow rate instruction S is 90%.

Figure 15:
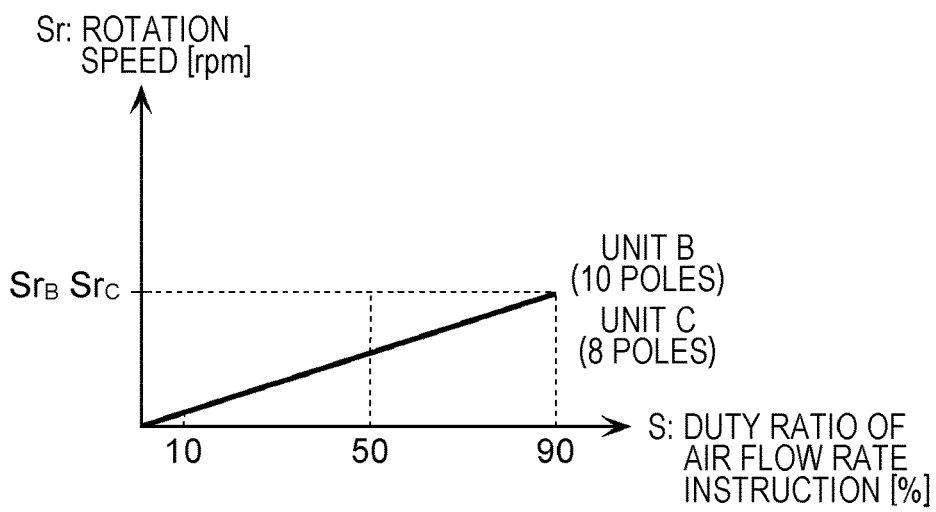
FIG. 15 is a schematic diagram illustrating relationships between duty ratio of an air flow rate instruction and rotation speed of a motor in units B and C that are determined in a second stage according to the second exemplary embodiment.

FIG. 15 is a schematic diagram illustrating the relationships between the duty ratio [%] of the air flow rate instruction S and the rotation speed Sr [rpm] of the motor in units B and C, which are determined in the second stage according to the second exemplary embodiment. Since $Sr_B$ and $Sr_C$ are equal to each other, the relationship between the duty ratio [%] of the air flow rate instruction S and the rotation speed Sr [rpm] of the motor is identical for units B and C as illustrated in FIG. 15.

As described above, the relationship between the frequency of the speed notification FG, that is, the frequency of the Hall signal H and the rotation frequency of the motor is such that the frequency of the speed notification FG is equal to the rotation frequency of the motor×the number of poles of the motor (10 in this case)×½ times. By using this relationship, as a third stage, on the basis of the relationship between the duty ratio [%] of the air flow rate instruction S and the rotation speed Sr [rpm] of the motor in each of units B and C, which is determined in the second stage, the relationship between the duty ratio [%] of the air flow rate instruction S and the frequency [Hz] of the speed notification FG in each of units B and C is calculated.

Figure 16:
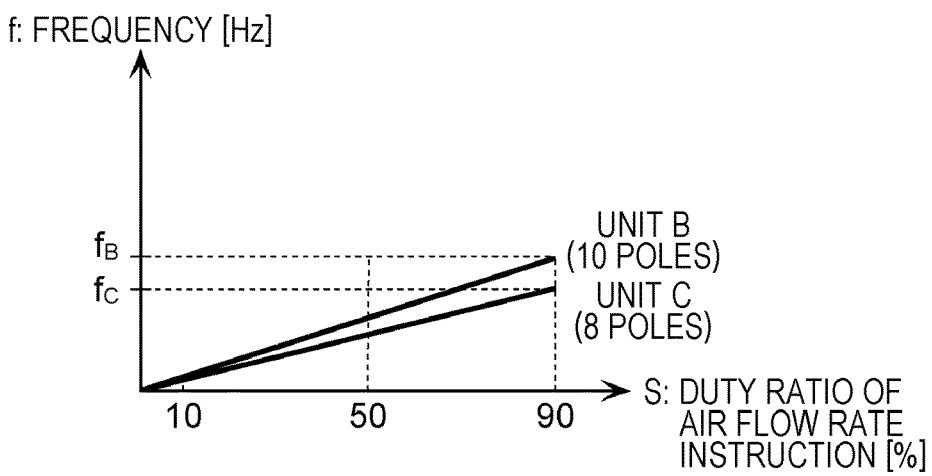
FIG. 16 is a schematic diagram illustrating relationships between duty ratio of an air flow rate instruction and frequency of a speed notification in units B and C that are determined in a third stage according to the second exemplary embodiment.

FIG. 16 is a schematic diagram illustrating the relationships between the duty ratio [%] of the air flow rate instruction S and the frequency [Hz] of the speed notification FG in units B and C determined in the third stage according to the second exemplary embodiment. In the units B and C, the relationship between the duty ratio [%] of the air flow rate instruction S and the rotation speed Sr [rpm] of the motor is identical. However, there is a difference between the number of poles of the motor included in unit B and the number of poles of the motor included in unit C. Therefore, as illustrated in FIG. 16, the relationship between the duty ratio [%] of the air flow rate instruction S and the frequency [Hz] of the speed notification FG is different between units B and C.

Correspondence relationship holder 14A stores in advance the correspondence table indicating the relationship between the duty ratio [%] of the air flow rate instruction S and the frequency [Hz] of the speed notification FG in each of units B and C calculated in the third stage.

Figure 17A:
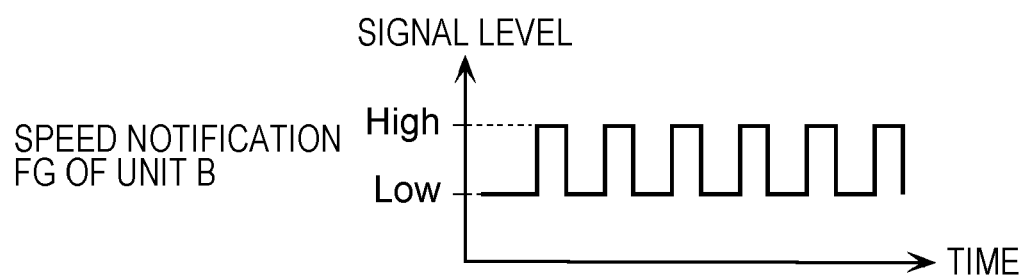
FIG. 17A is a schematic diagram illustrating a waveform of a first speed notification that is output from unit B in response to a first air flow rate instruction in a case where the first air flow rate instruction has been output to unit B by an air flow rate instruction output unit according to the second exemplary embodiment.
Figure 17B:
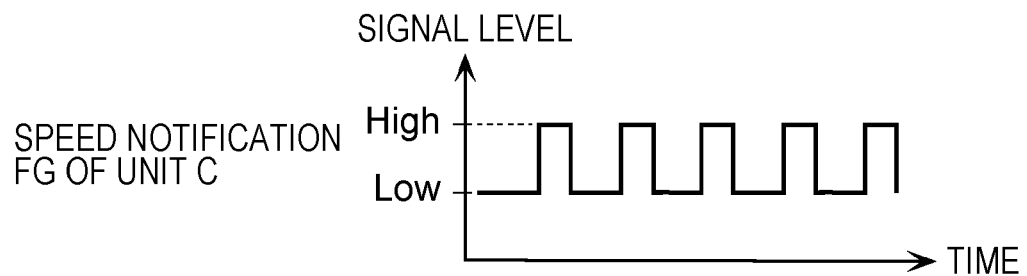
FIG. 17B is a schematic diagram illustrating a waveform of a first speed notification that is output from unit C in response to a first air flow rate instruction in a case where the first air flow rate instruction has been output to unit C by the air flow rate instruction output unit according to the second exemplary embodiment.

FIG. 17A is a schematic diagram illustrating a waveform of a first speed notification FG that is output from unit B in response to a first air flow rate instruction S in a case where the first air flow rate instruction S has been output to unit B by air flow rate instruction output unit 11 according to the second exemplary embodiment. FIG. 17B is a schematic diagram illustrating a waveform of a first speed notification FG that is output from unit C in response to a first air flow rate instruction S in a case where the first air flow rate instruction S has been output to unit C by air flow rate instruction output unit 11 according to the second exemplary embodiment.

As illustrated in FIGS. 17A and 17B, a frequency of the first speed notification FG is different between a case where fan motor unit 20 is unit B and a case where fan motor unit 20 is unit C.

Therefore, on the basis of the correspondence table held in correspondence relationship holder 14A, when a relationship between the first air flow rate instruction S and the first speed notification FG corresponds to unit B, identification unit 13 outputs the type identification signal for identifying unit B, and when the relationship between the first air flow rate instruction S and the first speed notification FG corresponds to unit C, identification unit 13 outputs the type identification signal for identifying unit C.

The type identification signal that is output from controller 10A is output in the ECU as illustrated in FIG. 2, for example. Specifically, the type identification signal is output to a determination unit (not illustrated) or the like provided in the ECU.

<Consideration>

As described above, with respect to the air blowing system according to the second exemplary embodiment, even in a case where the plurality of types of fan motor units targeted by the correspondence table have the same shape of the fan and the same shape of the casing but have mutually different numbers of poles of the motor, it is possible to identify the type of fan motor unit 20 on the basis of the first air flow rate instruction S and the first speed notification FG and to output the type identification signal indicating the identified type.

In addition, as disclosed in the first exemplary embodiment, with respect to air blowing system 1, in the case where the plurality of types of fan motor units targeted by the correspondence table are different in at least one of the shape of the fan and the shape of the casing but have the same number of poles of the motor, it is possible to output the type identification signal for identifying the type of fan motor unit 20 on the basis of the first air flow rate instruction S and the first speed notification FG.

Therefore, it is apparent to achieve the following function by applying the techniques disclosed in the first exemplary embodiment to the air blowing system according to the second exemplary embodiment. The function in which the air blowing system can identify the type of fan motor unit 20 on the basis of the first air flow rate instruction S and the first speed notification FG and can output the type identification signal indicating the identified type even in a case where the plurality of types of fan motor units targeted by the correspondence table are different from each other in at least one of the shape of the fan, the shape of the casing, and the number of poles of the motor.

Third Exemplary Embodiment

Hereinafter, an air blowing system according to a third exemplary embodiment will be described. In the description, with respect to the air blowing system according to the third exemplary embodiment, the components similar to those of air blowing system 1 according to the first exemplary embodiment are considered to have been already described; therefore, such similar components are assigned the same reference marks and detailed description thereof is omitted.

Air blowing system 1 according to the first exemplary embodiment and the air blowing system according to the second exemplary embodiment are each a configuration example that describes, as an example, a case where the operating point of fan motor unit 20 is limited to be in linear region T1 (see FIG. 6). In contrast, the air blowing system according to the third exemplary embodiment is a configuration example that describes, as an example, a case where the operating point of fan motor unit 20 is not limited to be in linear region T1.

Figure 18:
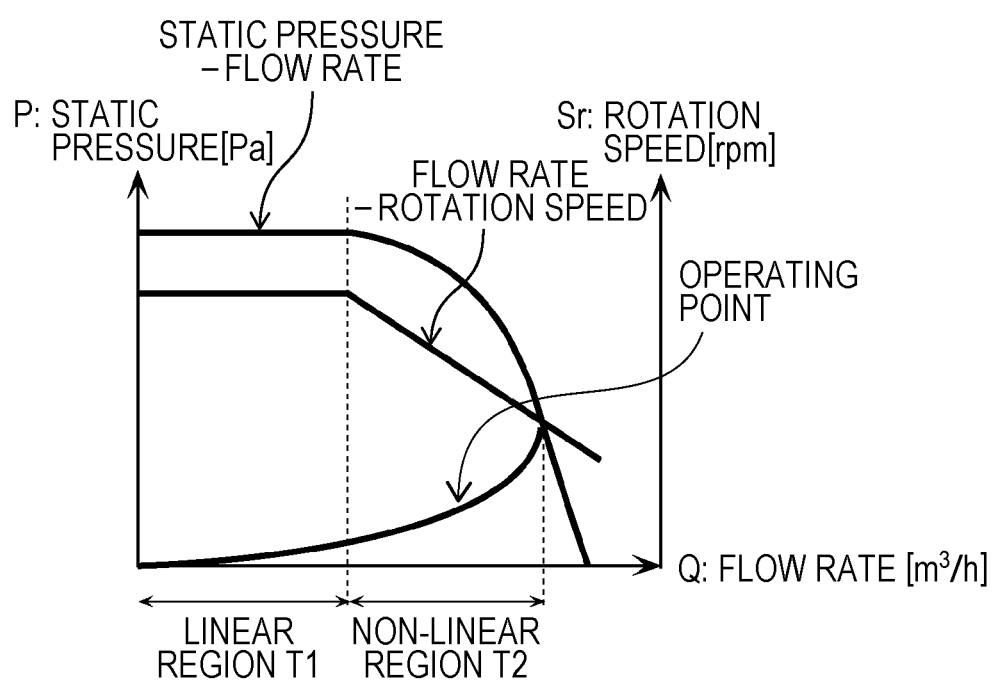
FIG. 18 is a schematic diagram illustrating, with respect to a third exemplary embodiment, a relationship between static pressure of a fan motor unit and flow rate, a relationship between rotation speed of a motor and flow rate, and an operating point of the fan motor unit.

FIG. 18 is a schematic diagram illustrating, with respect to the third exemplary embodiment, a relationship between a static pressure P [Pa] of fan motor unit 20 and a flow rate Q [m³/h], a relationship between a rotation speed Sr [rpm] of motor 21 and a flow rate Q [m³/h], and an operating point of fan motor unit 20.

As illustrated in FIG. 18, in the third exemplary embodiment, the operating point of fan motor unit 20 is located across linear region T1 and non-linear region T2.

The air blowing system according to the third exemplary embodiment is configured such that controller 10 of the air blowing system according to the first exemplary embodiment is changed to controller 10B according to the third exemplary embodiment.

Figure 19:
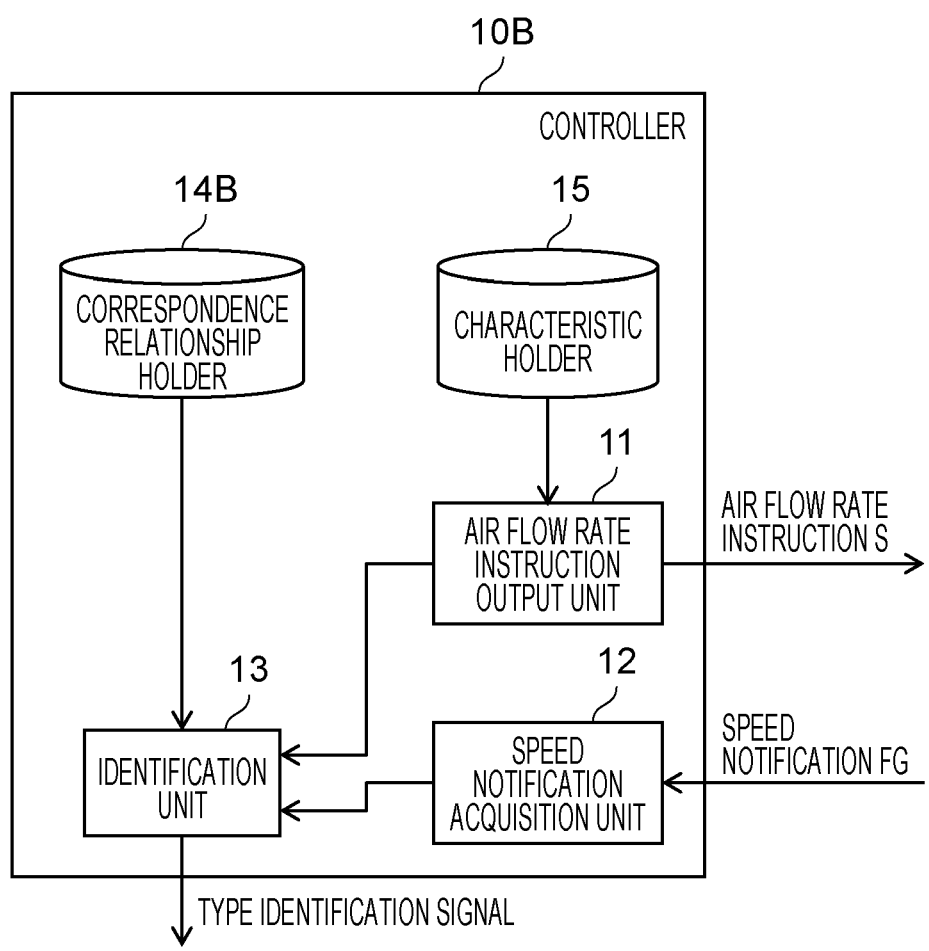
FIG. 19 is a block diagram illustrating a configuration example of a controller according to the third exemplary embodiment.

FIG. 19 is a block diagram illustrating a configuration example of controller 10B according to the third exemplary embodiment.

As illustrated in FIG. 19, controller 10B is configured by being modified from controller 10 according to the first exemplary embodiment. Controller 10B is configured such that correspondence relationship holder 14 is changed to correspondence relationship holder 14B.

Correspondence relationship holder 14B holds a correspondence table representing a correspondence relationship between the air flow rate instruction S and the speed notification FG for each of the plurality of types of fan motor units. The correspondence table is previously created.

Figure 20:
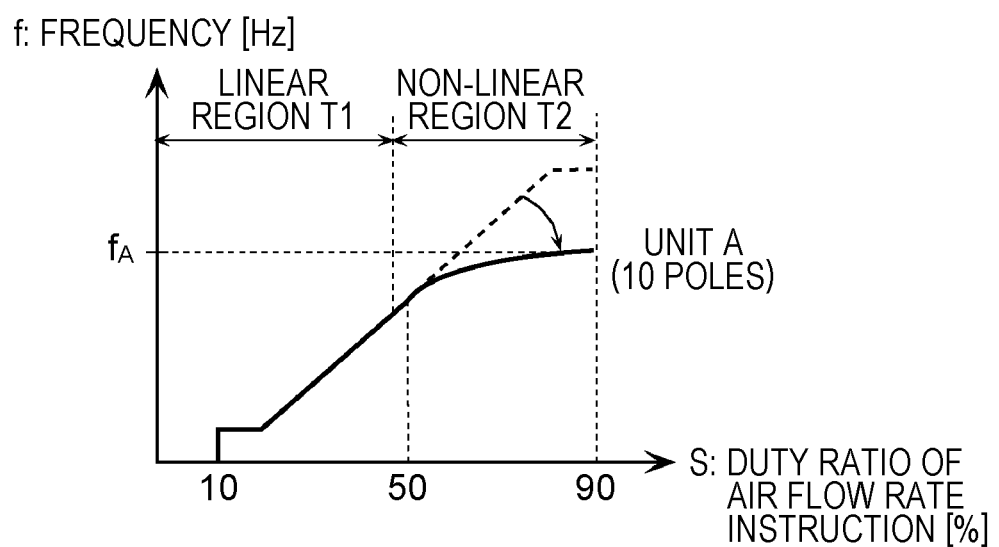
FIG. 20 is a schematic diagram illustrating a relationship between duty ratio of an air flow rate instruction and frequency of a speed notification for one type of fan motor unit that is represented by a correspondence table stored in a correspondence relationship holder according to the third exemplary embodiment.

FIG. 20 is a schematic diagram illustrating a correspondence relationship between a duty ratio [%] of the air flow rate instruction S and a frequency [Hz] of the speed notification FG for one type of fan motor unit 20, which is represented by the correspondence table stored in correspondence relationship holder 14B.

As illustrated in FIG. 20, when the operating point of fan motor unit 20 is in linear region T1, the relationship between the air flow rate instruction S and the speed notification FG is a linear relationship. On the other hand, when the operating point of fan motor unit 20 is in non-linear region T2, the relationship between the air flow rate instruction S and the speed notification FG is not a linear relationship. This is because a load of motor 21 is relatively high in non-linear region T2, and motor 21 therefore cannot rotate at the rotation speed corresponding to the three-phase AC power supplied from drive circuit 28.

As described above, when the operating point of fan motor unit 20 is not limited to be in linear region T1, the relationship between the air flow rate instruction S and the speed notification FG is not necessarily a linear relationship. However, the relationship between the air flow rate instruction S and the speed notification FG can be created, for example, by performing a test using an actual machine or by simulation using a simulator. Correspondence relationship holder 14B stores the correspondence table created previously in this manner.

The type identification signal that is output from controller 10B is output in the ECU as illustrated in FIG. 2, for example. Specifically, the type identification signal is output to a determination unit (not illustrated) or the like provided in the ECU.

<Consideration>

As described above, in the air blowing system according to the third exemplary embodiment, correspondence relationship holder 14B holds the correspondence table for a case where the operating point of fan motor unit 20 is not limited to be in linear region T1. Therefore, with the air blowing system of the third exemplary embodiment, even when the operating point of fan motor unit 20 is not limited to be in linear region T1, it is possible to identify the type of the fan motor unit 20 on the basis of the first air flow rate instruction S and the first speed notification FG and to output the type identification signal indicating the identified type.

Fourth Exemplary Embodiment

Hereinafter, an air blowing system according to a fourth exemplary embodiment will be described. In the description, with respect to the air blowing system according to the fourth exemplary embodiment, the components similar to those of the air blowing system according to the third exemplary embodiment have already been described; therefore, such similar components are assigned the same reference marks and detailed description thereof is omitted.

The air blowing system according to the fourth exemplary embodiment has a function similar to the function of the air blowing system according to the third exemplary embodiment. The air blowing system according to the fourth exemplary embodiment further has a function of outputting, when the relationship between the first air flow rate instruction S and the first speed notification FG satisfies a predetermined relationship, an abnormality detection signal indicating that an abnormality related to fan motor unit 20 has been detected.

The air blowing system according to the fourth exemplary embodiment is configured such that controller 10B of the air blowing system according to the third exemplary embodiment is changed to controller 10C according to the fourth exemplary embodiment.

Figure 21:
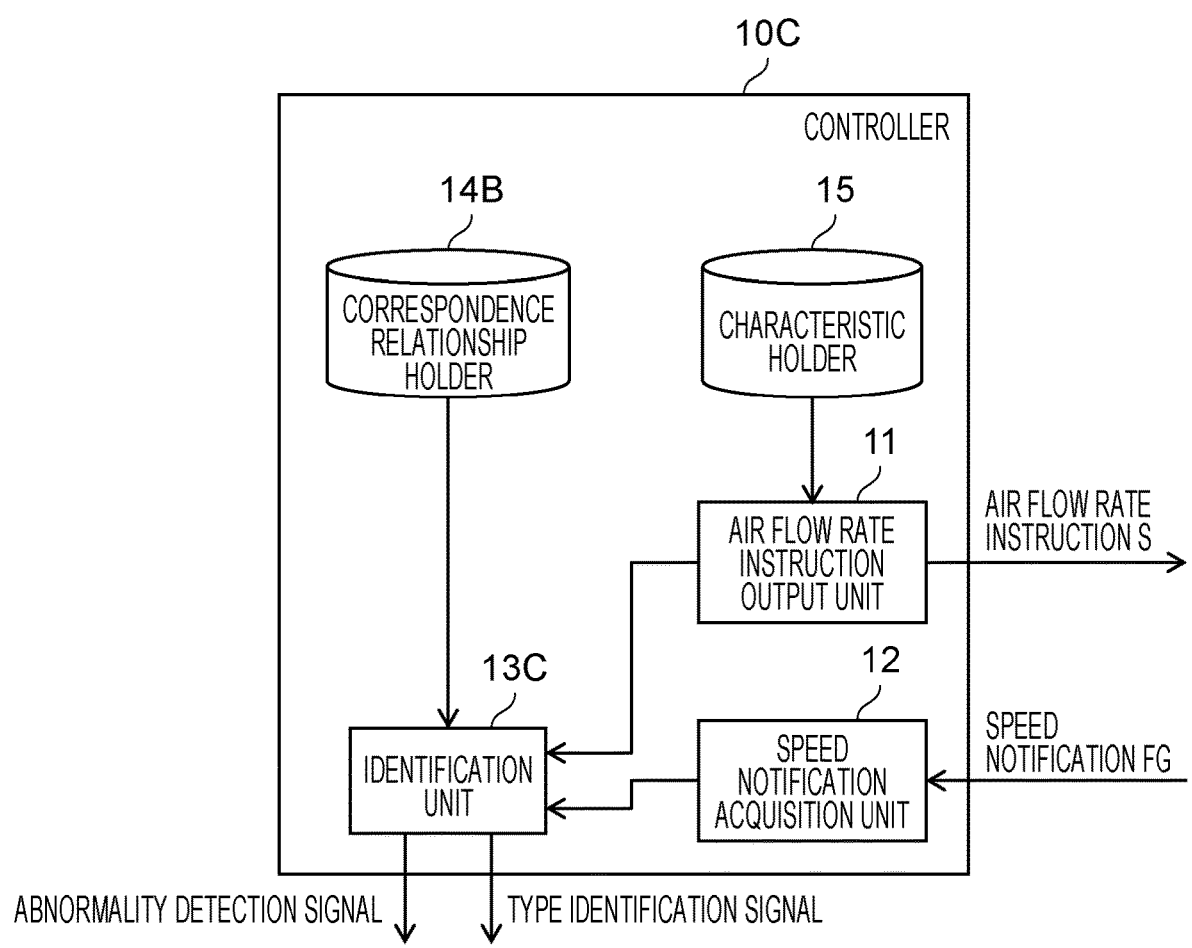
FIG. 21 is a block diagram illustrating a configuration example of a controller according to a fourth exemplary embodiment.

FIG. 21 is a block diagram illustrating a configuration example of controller 10C according to the fourth exemplary embodiment.

As illustrated in FIG. 21, controller 10C is configured by being modified from controller 10B according to the third exemplary embodiment. Controller 10C is configured such that identification unit 13 is changed to identification unit 13C.

Identification unit 13C has a function similar to the function of identification unit 13 according to the third exemplary embodiment. Identification unit 13C further has the following function.

Specifically, when, on the basis of the correspondence table held in correspondence relationship holder 14B, the correspondence relationship between the first air flow rate instruction S and the first speed notification FG does not correspond to any of the plurality of types of fan motor units targeted by the correspondence table, identification unit 13C outputs an abnormality detection signal indicating that an abnormality related to fan motor unit 20 has been detected.

As will be described below using an example, in the air blowing system according to the fourth exemplary embodiment, examples of the abnormality related to fan motor unit 20 include one type of abnormality in which the relationship between the air flow rate instruction S and the speed notification FG changes. Therefore, it is considered that, when the correspondence relationship between the first air flow rate instruction S and the first speed notification FG does not correspond to any of the plurality of types of fan motor units targeted by the correspondence table, there is occurring an abnormality related to fan motor unit 20 of a type that the relationship between the air flow rate instruction S and the speed notification FG changes. Therefore, when the correspondence relationship between the first air flow rate instruction S and the first speed notification FG does not correspond to any of the plurality of types of fan motor units targeted by the correspondence table, identification unit 13C outputs an abnormality detection signal.

FIG. 22 is a schematic diagram illustrating how the relationship between the air flow rate instruction S and the speed notification FG changes due to abnormalities related to fan motor unit 20 according to the fourth exemplary embodiment.

As illustrated in FIG. 22, for example, when there occurs an abnormality that a separator between the cell batteries in battery pack 30 comes off, an air-flow resistance against the air blown by fan motor unit 20 decreases. As a result, the operating point of fan motor unit 20 moves toward non-linear region T2. Therefore, the relationship between the air flow rate instruction S and the speed notification FG changes. More specifically, the change occurs such that the region in which the relationship between the air flow rate instruction S and the speed notification FG is a linear relationship becomes narrow.

For example, when there occurs an abnormality that the duct of fan motor unit 20 comes off from battery pack 30, the air-flow resistance against the air blown by fan motor unit 20 decreases. As a result, the operating point of fan motor unit 20 moves toward non-linear region T2. Therefore, the relationship between the air flow rate instruction S and the speed notification FG changes. More specifically, the change occurs such that the region in which the relationship between the air flow rate instruction S and the speed notification FG is a linear relationship becomes narrow.

For example, when there occurs an abnormality that an object is clogged between the cell batteries in battery pack 30, the air-flow resistance against the air blown by fan motor unit 20 increases. As a result, the operating point of fan motor unit 20 moves toward linear region T1. Therefore, the relationship between the air flow rate instruction S and the speed notification FG changes. More specifically, the change occurs such that the region in which the relationship between the air flow rate instruction S and the speed notification FG is a linear relationship becomes wide.

For example, when there occurs an abnormality that an object is clogged in the duct of fan motor unit 20, the air-flow resistance against the air blown by fan motor unit 20 increases. As a result, the operating point of fan motor unit 20 moves toward linear region T1. Therefore, the relationship between the air flow rate instruction S and the speed notification FG changes. More specifically, the change occurs such that the region in which the relationship between the air flow rate instruction S and the speed notification FG is a linear relationship becomes wide.

An operation performed by the air blowing system according to the fourth exemplary embodiment having the above configuration will be described below.

The air blowing system according to the fourth exemplary embodiment performs a second identification process of outputting a type identification signal or an abnormality detection signal.

Figure 23:
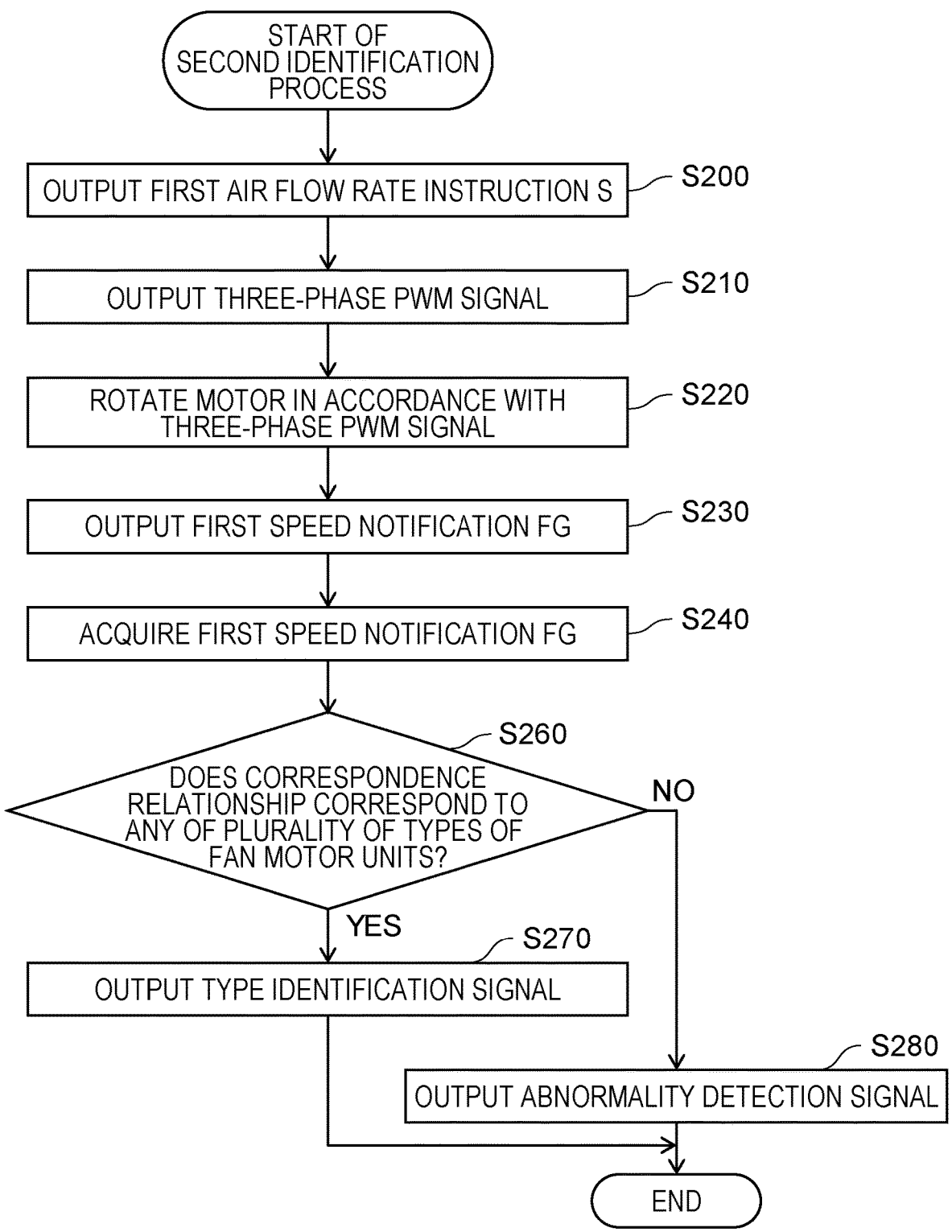
FIG. 23 is a flowchart of a second identification process according to the fourth exemplary embodiment.

FIG. 23 is a flowchart of the second identification process.

In FIG. 23, the process of step S200 to the process of step S240 are the same processes as the processes of step S100 to the process of step S140 of the first identification process according to the first exemplary embodiment when "identification unit 13" is replaced with "identification unit 13C". Therefore, in this description, the process of step S200 to the process of step S240 are considered to have been already described, the detailed description of the processes will be omitted, and a process of step S260 to a process of step S280 will be mainly described.

When the process of step S240 is completed, identification unit 13C determines, on the basis of the correspondence table held in correspondence relationship holder 14B, whether the correspondence relationship between the first air flow rate instruction S and the first speed notification FG corresponds to any of the plurality of types of fan motor units targeted by the correspondence table (step S260).

In the process of step S260, when the correspondence relationship between the first air flow rate instruction S and the first speed notification FG corresponds to any of the plurality of types of fan motor units targeted by the correspondence table (step S260: Yes), identification unit 13C outputs a type identification signal for identifying the corresponding type of fan motor unit (step S270).

In the process of step S260, when the correspondence relationship between the first air flow rate instruction S and the first speed notification FG does not correspond to any of the plurality of types of fan motor units targeted by the correspondence table (step S260: No), identification unit 13C outputs an abnormality detection signal indicating that an abnormality related to fan motor unit 20 has been detected (step S280).

The type identification signal or the abnormality detection signal that is output from controller 10C is output in the ECU as illustrated in FIG. 2, for example. Specifically, the type identification signal or the abnormality detection signal is output to a determination unit (not illustrated) or the like provided in the ECU.

When the process of step S270 is completed or when the process of step S280 is completed, the air blowing system according to the fourth exemplary embodiment ends the second identification process.

<Consideration>

As described above, with the air blowing system according to the fourth exemplary embodiment, when the correspondence relationship between the first air flow rate instruction S and the first speed notification FG does not correspond to any of the plurality of types of fan motor units targeted by the correspondence table, an abnormality detection signal is output. As a result, an abnormality related to fan motor unit 20 is quickly found.

Other Exemplary Embodiments

The first to fourth exemplary embodiments have been described above as examples of the technique disclosed in the present application. However, the present disclosure is not limited to these exemplary embodiments. Without departing from the gist of the present disclosure, the scope of the technique disclosed in the present application may include: a configuration in which various variations conceived by those skilled in the art are applied to the present exemplary embodiments; or a configuration established by combining the components in different exemplary embodiments.

(1) The first to fourth exemplary embodiments have described that correspondence relationship holders 14 to 14B hold the correspondence table indicating the correspondence relationship between the air flow rate instruction S and the speed notification FG for each of the plurality of types of fan motor units. However, as long as correspondence relationship holders 14 to 14B hold the correspondence relationship information indicating the correspondence relationship between the air flow rate instruction S and the speed notification FG for each of the plurality of types of fan motor units, correspondence relationship holders 14 to 14B do not have to be configured to hold the correspondence table as the correspondence relationship information. For example, correspondence relationship holder 14 may be configured to hold, as the correspondence relationship information, a function representing the correspondence relationship between the air flow rate instruction S and the speed notification FG for each of the plurality of types of fan motor units.

(2) One aspect of the present disclosure is not limited to the above air blowing systems and may be a method that includes, as steps, the characteristic processes performed by the air blowing system. One aspect of the present disclosure may be a computer program causing a computer to perform the steps included in the method. One aspect of the present disclosure may be a non-transitory computer-readable recording medium on which the above computer program is recorded.

The present disclosure is widely applicable to an air blowing system that blows air.

The invention claimed is:

1. An identification method for identifying a type of a fan motor unit in an air blowing system that includes:
the fan motor unit, the fan motor unit including:
a motor;
a fan that rotates by rotation of the motor; and
a casing that covers at least a part of the fan, wherein the fan motor unit blows air to an outside; and
a controller that controls the fan motor unit, wherein the controller outputs, to the fan motor unit, air flow rate instructions each for controlling an air flow rate of the air blown by the fan motor unit, and the fan motor unit outputs, to the controller, speed notifications each indicating a rotation state of the motor, respectively,
the identification method comprising:
a first step of the controller outputting, to the fan motor unit, a first air flow rate instruction, as one of the air flow rate instructions, that is output at a time of performing control to cause the fan motor unit to operate normally;
a second step of the controller acquiring a first speed notification, as one of the speed notifications, that is output from the fan motor unit in response to the outputting of the first air flow rate instruction; and
a third step of the controller identifying, based on the first air flow rate instruction and the first speed notification, a type of the fan motor unit and outputting a type identification signal indicating the identified type, wherein:
rotation of the motor is controlled by pulse width modulation (PWM) control,
each of the air flow rate instructions include a PWM duty signal having a duty ratio for controlling rotation of the motor by the PWM control,
the controller stores in advance a correspondence table indicating the relationship between the duty ratio of the PWM duty signal of the air flow rate instructions and a frequency of the speed notifications,
the controller outputs the type identification signal indicating the identified type based on the correspondence table, and
each of the speed notifications is a pulse signal having a frequency of n/2 times a rotation frequency of the motor, supposing that a number of poles of the motor is n, where n is an integer more than or equal to 2.

2. The identification method according to claim 1, wherein
the correspondence table indicates the relationship between the duty ratio of the PWM duty signal and the frequency of the notifications for each of a plurality of types of fan motor units, and
in the third step, when a correspondence relationship between the first air flow rate instruction and the first speed notification corresponds, based on the correspondence table, to one type of fan motor unit of the plurality of types of fan motor units, the controller outputs the type identification signal for identifying the one type of fan motor unit.

3. The identification method according to claim 2, wherein the third step further includes a fourth step of, when the correspondence relationship between the first air flow rate instruction and the first speed notification does not correspond, based on the correspondence table, to any of the plurality of types of fan motor units, the controller outputting an abnormality detection signal indicating that an abnormality related to the fan motor unit has been detected.

4. The identification method according to claim 1, wherein in the first step, the controller outputs the first air flow rate instruction including the duty ratio of the PWM duty signal in a range where a relationship between the duty ratio of the PWM duty signal and the frequency of the pulse signal is a linear relationship.

5. An air blowing system comprising:
a fan motor unit, the fan motor unit including:
a motor;
a fan that rotates by rotation of the motor; and
a casing that covers at least a part of the fan, wherein the fan motor unit blows air to an outside; and
a controller that controls the fan motor unit, wherein:
the controller outputs, to the fan motor unit, air flow rate instructions each for controlling an air flow rate of the air blown by the fan motor unit,
the fan motor unit outputs, to the controller, speed n notifications indicating a rotation state of the motor, and
in a case where the controller has output, to the fan motor unit, a first air flow rate instruction, as one of the air flow instructions, that is output at a time of performing control to cause the fan motor unit to operate normally, when a first speed notification, as one of the speed notifications, is output from the fan motor unit in response to the first air flow rate instruction, the controller identifies, based on the first air flow rate instruction and the first speed notification, a type of the fan motor unit and outputs a type identification signal indicating the identified type,
rotation of the motor is controlled by pulse width modulation (PWM) control,
each of the air flow instructions is a PWM duty signal having a duty ratio for controlling rotation of the motor by the PWM control,
the controller stores in advance a correspondence table indicating the relationship between the duty ratio of the PWM duty signal of the air flow rate instructions and a frequency of the speed notifications,
the controller outputs the type identification signal indicating the identified type based on the correspondence table, and
each of the speed notifications is a pulse signal having a frequency of n/2 times a rotation frequency of the motor, supposing that a number of poles of the motor is n, where n is an integer more than or equal to 2.

6. The air blowing system according to claim 5, wherein:
the correspondence table indicates the relationship between the duty ratio of the PWM duty signal and the frequency of the notifications for each of a plurality of types of fan motor units, and when a correspondence relationship between the first air flow rate instruction and the first speed notification corresponds, based on the correspondence table, to one type of fan motor unit of the plurality of types of fan motor units, the controller outputs the type identification signal for identifying the one type of fan motor unit.

7. The air blowing system according to claim 6, wherein, when the correspondence relationship between the first air flow rate instruction and the first speed notification does not correspond, based on the correspondence table, to any of the plurality of types of fan motor units, the controller outputs an abnormality detection signal indicating that an abnormality related to the fan motor unit has been detected.

8. The air blowing system according to claim 5, wherein the controller outputs the first air flow rate instruction including the duty ratio of the PWM duty signal in a range where a relationship between the duty ratio of the PWM duty signal and the frequency of the pulse signal is a linear relationship.

\* \* \* \* \*